United States Patent
Diallo

(10) Patent No.: US 7,470,369 B2
(45) Date of Patent: *Dec. 30, 2008

(54) WATER TREATMENT BY DENDRIMER ENHANCED FILTRATION

(75) Inventor: Mamadou S. Diallo, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 11/182,314

(22) Filed: Jul. 15, 2005

(65) Prior Publication Data

US 2006/0021938 A1 Feb. 2, 2006

Related U.S. Application Data

(60) Provisional application No. 60/588,626, filed on Jul. 16, 2004.

(51) Int. Cl.
- *B01D 61/14* (2006.01)
- *B01D 61/18* (2006.01)
- *C02F 1/42* (2006.01)
- *B01D 63/00* (2006.01)

(52) U.S. Cl. .............. 210/650; 210/651; 210/665; 210/666; 210/670; 210/702; 210/257.2; 210/260; 210/692

(58) Field of Classification Search .......... None
See application file for complete search history.

(56) References Cited

U.S. PATENT DOCUMENTS

| | | | | |
|---|---|---|---|---|
| 4,207,183 A | * | 6/1980 | Herrigel | 204/518 |
| 4,731,187 A | * | 3/1988 | Moriya et al. | 210/719 |
| 4,871,779 A | | 10/1989 | Killat et al. | |
| 4,915,844 A | * | 4/1990 | Imamura et al. | 210/651 |
| 5,182,023 A | * | 1/1993 | O'Connor et al. | 210/652 |
| 5,556,545 A | * | 9/1996 | Volchek et al. | 210/651 |
| 5,643,456 A | | 7/1997 | Smith et al. | |

(Continued)

FOREIGN PATENT DOCUMENTS

GR 1004458 2/2004

(Continued)

OTHER PUBLICATIONS

Khaled Al-Rabe, "Characterization of Co(II) Binding to PAMAM G4-NH2 Dendrimer in Aqueous Solutions Using UV and EPR Spectroscopy", Research Science Institute, Aug. 3, 2004, 13 pgs.

(Continued)

*Primary Examiner*—Krishnan S Menon
(74) *Attorney, Agent, or Firm*—Thelen LLP; David B. Ritchie

(57) ABSTRACT

Described herein are compositions and methods useful for the purification of water using dendritic macromolecules. The process involves using dendritic macromolecules (dendrimers) to bind to contaminants, and a filtration step to produce water from which contaminants have been removed or modified. Examples of dendrimers that may be used in the process include cation-binding dendrimers, anion-binding dendrimers, organic compound-binding dendrimers, redox-active dendrimers, biological compound-binding dendrimers, catalytic dendrimers, biocidal dendrimers, viral-binding dendrimers, multi-functional dendrimers, and combinations thereof. The process is readily scalable and provides many options for customization.

23 Claims, 19 Drawing Sheets

U.S. PATENT DOCUMENTS

| | | | |
|---|---|---|---|
| 5,739,218 | A | 4/1998 | Dvornic et al. |
| 5,766,478 | A | 6/1998 | Smith et al. |
| 6,338,803 | B1 * | 1/2002 | Campbell et al. .......... 210/652 |
| 6,380,276 | B1 * | 4/2002 | Borovik et al. .............. 521/153 |
| 6,749,756 | B1 * | 6/2004 | Curran et al. ................. 506/41 |
| 6,908,496 | B2 * | 6/2005 | Halas et al. ................... 75/370 |
| 7,048,864 | B2 * | 5/2006 | King et al. .................. 210/764 |
| 2004/0168981 | A1 * | 9/2004 | Dudziak et al. ............. 210/644 |
| 2004/0188359 | A1 * | 9/2004 | King et al. .................. 210/764 |
| 2006/0157418 | A1 * | 7/2006 | Paleos et al. ................ 210/692 |
| 2006/0157427 | A1 * | 7/2006 | King et al. .................. 210/764 |

FOREIGN PATENT DOCUMENTS

| | | |
|---|---|---|
| JP | 2004089817 | 3/2004 |
| WO | 2006096199 A2 | 9/2006 |
| WO | 2006096199 A3 | 9/2006 |

OTHER PUBLICATIONS

Michael Arkas et al., "Functional Dendrimeric "Nanosponges" for the Removal of Polycyclic Aromatic Hydrocarbons from Water", 2003, pp. 2844-2847, American Chemical Society, published on web Jun. 6, 2003.

Michael Arkas et al., "Alkylated Hyperbranched Polymers as Molecular Nanosponges for the Purification of Water from Polycyclic Aromatic Hydrocarbons", Journal of Applied Polymer Science, 2005, pp. 2299-2305, vol. 97, Wiley Periodicals, Inc.

Michael Arkas et al., "Organosilicon Dendritic Networks in Porous Ceramics for Water Purification", 2005, pp. 3439-3444, American Chemical Society, published on web Jun. 4, 2005.

Eva R. Birnbaum et al., "Selective Anion Binding from Water Using Soluble Polymers", Separation Science and Technology, 2003, pp. 389-404, vol. 38, No. 2, Marcel Dekker, Inc.

A. W. Bosman et al., "About Dendrimers: Structure, Physical Properties, and Applications", Chem. Rev., 1999, pp. 1-43.

Chris Zhisheng Chen et al., "Incorporation of dimethyldodecylammonium chloride functionalities onto poly (propylene imine) dendrimers significantly enhances their antibacterial properties", Chem. Commun., 1999, pp. 1585-1586.

David J. Cole-Hamilton., "Homogeneous Catalysis-New Approaches to Catalyst Separation, Recovery, and Recycling", Science, Mar. 14, 2003, pp. 1702-1706, vol. 299, No. 5613.

Richard M. Crooks et al., "Dendrimer-Encapsulated Metals and Semiconductors: Synthesis, Characterization, and Applications", Topics in Current Chemistry, 2001, pp. 81-135, vol. 212, Springer-Verlag Berlin Heidelberg.

Mamadou S. Diallo et al., "Dendritic Nanoscale Chelating Agents: Synthesis, Characterization, Molecular Modeling and Environmental Applications", Proceedings EPA Nanotechnology and the Environment: Applications and Implications STAR Progress Review Workshop, Aug. 28-29, 2002, 3 pgs., Arlington, Virginia.

Mamadou S. Diallo et al., "Dendritic Nanoscale Chelating Agents: Synthesis, Characterization, Molecular Modeling and Environmental Applications", Proceedings U.S. EPA 2004 Nanotechnology Science to Achieve Results (STAR) Progress Review Workshop-Nanotechnology and the Environment II, Aug. 18-20, 2004, 2 pgs., Philadelphia, Pennsylvania.

Mamadou S. Diallo et al., "Dendritic Nanoscale Chelating Agents: Synthesis, Characterization, Molecular Modeling and Environmental Applications", 2002, pp. 1-2, downloaded from http://cfpub.epa.gov/ncer_abstracts/index.cfm/fuseaction/display.abstractDetail/abstract/23... on Jun. 13, 2008.

Mamadou S. Diallo et al., "2002 Progress Report: Dendritic Nanoscale Chelating Agents: Synthesis, Characterization, Molecular Modeling and Environmental Applications", 2002, pp. 1-3, downloaded from http://cfpub.epa.gov/ncer_abstracts/index.cfm/fuseaction/display.abstractDetail/abstract/23... on Jun. 13, 2008.

Mamadou S. Diallo et al., "2003 Progress Report: Dendritic Nanoscale Chelating Agents: Synthesis, Characterization, Molecular Modeling and Environmental Applications", 2003, pp. 1-3, downloaded from http://cfpub.epa.gov/ncer_abstracts/index.cfm/fuseaction/display.abstractDetail/abstract/23... on Jun. 13, 2008.

Mamadou S. Diallo et al., "Final Report: Dendritic Nanoscale Chelating Agents: Synthesis, Characterization, Molecular Modeling and Environmental Applications", 2005, pp. 1-5, downloaded from http://cfpub.epa.gov/ncer_abstracts/index.cfm/fuseaction/display.abstractDetail/abstract/23... on Jun. 13, 2008.

Mamadou Diallo, "Project Uses Dendrimer Nanotechnology to Improve Water Treatment Processes", National Water Research Institute Briefings, Spring 2005, pp. 1-3, vol. 14, No. 1.

Mamadou S. Diallo et al., "Poly(amidoamine) Dendrimers: A New Class of High Capacity Chelating Agents for Cu(II) Ions," Environmental Science and Technology, 1999, pp. 820-824, vol. 33, No. 5, American Chemical Society, published on web Jan. 26, 1999.

Mamadou S. Diallo et al., "Dendrimer Enhanced Ultrafiltration. 1. Recovery of Cu(II) from Aqueous Solutions Using PAMAM Dendrimers with Ethylene Diamine Core and Terminal NH2 Groups", Environmental Science and Technology, 2005, pp. 1366-1377, vol. 39, No. 5, American Chemical Society, published on web Jan. 22, 2005.

Mamadou S. Diallo et al., "Dendritic Chelating Agents. 1. Cu(II) Binding to Ethylene Diamine Core Poly (amidoamine) Dendrimers in Aqueous Solutions", Jan. 22, 2004, pp. A-L, American Chemical Society.

Mamadou S. Diallo et al., "The MSC-Howard University Collaborative Research Program in Nanoscale Environmental Science and Technology: Overview of Recent Advances", 1 pg.

Lynette Tally, "Effect of Solution pH on the Retention & Flux of Aqueous Solutions of G3, -NH2, PAMAM Dendrimer by Regenerated Cellulose Ultrafiltration Membranes", 2004, pp. 138-139, NNIN REU Research Accomplishments.

Rong-Qiang Fu et al., "Fundamental studies on the intermediate layer of a bipolar membrane. Part VI. Effect of the coordinated complex between starburst dendrimer PAMAM and chromium (III) on water dissociation at the interface of a bipolar membrane", 2006, pp. 260-265, Elsevier B.V.

Cordula Gruttner et al., "Dendrimer-coated magnetic particles for radionuclide separation", Journal of Magnetism and Magnetic Materials, 2005, pp. 559-566, Elsevier B.V.

Gordon D. Jarvinen et al., "Removal of Pu-238 from aqueous process streams using a polymer filtration process", Oct. 12, 2000, pp. 1-7, Los Alamos National Laboratory.

Amy S. H. King et al., "Heterogeneous and solid supported dendrimer catalysts", J. Chem. Soc., Perkin Trans. 1, 2002, pp. 2209-2218, The Royal Society of Chemistry.

Antonina P. Kryvoruchko et al., "Ultrafiltration removal of U(VI) from contaminated water", 2004, pp. 229-236, Elsevier B.V.

Lyndal McDowall, "Degradation of Toxic Chemicals by Zero-Valent Metal Nanoparticles-A Literature Review", Human Protection & Performance Division, Nov. 2005, 40 pgs., Commonwealth of Australia.

M. Francesca Ottaviani et al., "A TEM and EPR Investigation of the Competitive Binding of Uranyl Ions to Starburst Dendrimers and Liposomes: Potential Use of Dendrimers as Uranyl Ion Sponges", 2000, pp. 7368-7372, American Chemical Society, published on web Aug. 18, 2000.

S. Rathgeber et al., "Dynamics of star-burst dendrimers in solution in relation to their structural properties", Journal of Chemical Physics, Aug. 22, 2002, pp. 4047-4062, vol. 117, No. 8, American Institute of Physics.

A. Rether et al., "Selective separation and recovery of heavy metal ions using water-soluble N-benzoylthiourea modified PAMAM polymers", Reactive & Functional Polymers, 2003, pp. 13-21, Elsevier B.V.

David L. Russell, "Dendrimer-Based Chemistry Offers Challenging Alternative", 2004, pp. 1-3, Professional Water Technologies Inc., downloaded from http://www.pwtinc.com/RussellDWRArticle.htm.

Nora Savage et al., "Nanomaterials and water purification: Opportunities and challenges", Journal of Nanoparticle Research, 2005, pp. 331-342, Springer.

Robert W. J. Scott et al., "Synthesis, Characterization, and Applications of Dendrimer-Encapsulated Nanoparticles", 2005, pp. 692-704, American Chemical Society, published on web Dec. 7, 2004.

Bryan M. Smith et al., "Hyperbranched Chelating Polymers for the Polymer-Assisted Ultrafiltration of Boric Acid", Separation Science and Technology, 1999, pp. 1925-1945, Marcel Dekker, Inc.

Donald A. Tomalia et al., "Partial shell-filled core-shell tecto(dendrimers): A strategy to surface differentiated nano-clefts and cusps", PNAS, Apr. 16, 2002, pp. 5081-5087, vol. 99, No. 8.

Jian Xu et al., "Membrane-based Bimetallic Nanoparticles for Environmental Remediation: Synthesis and Reactive Properties", Environmental Progress, Dec. 2005, pp. 358-366, vol. 24, No. 4, American Institute of Chemical Engineers.

Fanwen Zeng et al., "Dendrimers in Supramolecular Chemistry: From Molecular Recognition to Self-Assembly", Chem. Rev., 1997, pp. 1681-1712, American Chemical Society.

Wei-Xian Zhang, "Nanoscale iron particles for environmental remediation: An overview", Journal of Nanoparticle Research 5, 2003, pp. 323-332, Kluwer Academic Publishers.

* cited by examiner

A.

B.

A.

B.

A.

B.

C.

A.

B.

WATER TREATMENT BY DENDRIMER ENHANCED FILTRATION

This application claims the benefit of priority from U.S. Provisional Application Ser. No. 60/588,626, filed Jul. 16, 2004.

GOVERNMENT RIGHTS

The United States Government has certain rights in this invention pursuant to Grant Nos. CTS-0086727 and CTS-0329436 awarded by the National Science Foundation.

FIELD OF THE INVENTION

The invention relates to compositions and methods useful for removing contaminants from water.

BACKGROUND OF THE INVENTION

Clean water is essential to human health. It is also a critical feedstock in a variety of key industries including the electronics, pharmaceutical and food industries. Treatment of groundwater, lakes and reservoirs is often required to make water safe for human consumption. For wastewater, treatment is necessary to remove harmful pollutants from domestic and industrial liquid waste so that it is safe to return to the environment. Current water treatment systems are generally large, centralized systems that comprise a number of steps, including treatment with anaerobic organisms, oxidizers, chlorine, and flocculants.

Because of their inherent flexibility, decentralized water treatment systems could provide more robust and cost effective means for dealing with (i) declining sources of freshwater, (ii) more stringent water quality standards and (iii) chemical and biological threats to local water supplies. It has been proposed that distributed optimal technology networks (DOT-NET) are an alternative to the large, centralized water treatment plants. The DOT-NET concept is predicated upon the distribution and strategic placement of relatively small and highly efficient treatment systems at specific locations in existing water supply networks. Filtration processes that remove specific contaminants are a key aspect of decentralized water treatment systems.

A number of water filtration processes have designed to remove organic compounds and metal ions from contaminated wastes been described in the literature. Two such processes are micellar-enhanced ultrafiltration (MEUF) (Scamehorn and Harwell, (1988) In *Surfactant Based Separation Processes*, Surfactant Science Series, Vol 33, Marcel Dekker, New York, Dunn et al., (1989) *Coll. Surf* 35:49, Baek et al., (2004) *J. Haz. Mater.* 1081:19, Richardson et al., (1999) *J. Appl. Polym. Sci.* 4:2290) and polymer supported ultrafiltration (PSUF) (Spivakov et al., (1985) *Nature* 315:313, Geckeler et al., (1996) *Envir. Sci. Technol.*, 30:725, Muslehiddinoglu et al., (1998) *J. Memb. Sci,* 140:251, Juang et al., (1993) *J. Membrane Sci.* 82:163.). In a typical MEUF process, a surfactant is added to polluted water. The aqueous solution is then passed through an ultrafiltration membrane with pore sizes smaller than those of the organic/metal ion laden micelles. In PEUF, a water-soluble linear polymer with strong binding affinity for the target metal ions is added to contaminated water. The resulting solution is passed through an ultrafiltration membrane (UF) with pore sizes smaller than those of the metal ion-polymer complexes.

MEUF is based on the use of non-covalently bonded micelles to extract organic solutes and/or bind metal ions. Micelles are dynamic and flexible structures with finite lifetime. Because of this, their size, shape, organic solubilization capacity, metal ion binding capacity and retention by UF membranes are very sensitive to surfactant concentration and solution physical-chemical conditions (e.g., pH, temperature, ionic strength, etc). Although the use of micellar solutions of height molecular weight block ABA copolymer of PEO-PPO-PEO surfactants could reduce surfactant losses to a certain extent (Richardson et al., (1999) *J. Appl. Polym. Sci.* 4:2290), the leakage of surfactant monomers remains a major problem in water treatment by MEUF.

In most cases, the surfactant solutions in MEUF processes are not very selective and have relatively low organic solute and metal ion binding capacity. For the most part, they solubilize organic solutes through partitioning in their hydrophobic core and bind metal ions through electrostatic interactions with their charged head-groups. Moreover, the development of surfactant solutions with redox, catalytic and biocidal activity remains a major challenge. Thus, MEUF has remained for the most part a separation process with limited practical applications.

The PSUF process has been primarily designed and evaluated to remove metal ions from contaminated wastewater streams. PSUF uses high molar mass linear polymers such as EDTA and macrocycles with amine groups (e.g., cyclams) that typically bind only one metal ion per molecule. While the components of a MEUF filtration system are somewhat adaptable to different functional groups, the PSUF process is not readily functionalizable, and neither MEUF nor PSUF have been shown to be capable of catalytic reactions. Due to the ongoing demand for clean water and the limitations of the current methods, there is a significant need in the art for a new water filtration process with a higher capacity for binding contaminants, as well as features that enable it to be scalable, flexible, and configurable to suit a varity of different water purification needs.

SUMMARY OF THE INVENTION

The invention disclosed herein comprises a method of removing contaminants from water. Embodiments of the invention include methods of filtering contaminated water, comprising providing a quantity of contaminated water, contacting the quantity of contaminated water with an amount of a dendrimer agent sufficient to bind at least a portion of the contaminants in the quantity of contaminated water to produce a quantity of contaminant-bound dendrimers, and filtering the contaminant-bound dendrimers from the quantity of contaminated water, whereby a quantity of filtered water is produced.

Further embodiments provide methods wherein at least a portion of dendrimers in the dendrimer agent remain unbound by contaminants, and further comprising filtering the unbound dendrimers from the quantity of contaminated water.

Still further embodiments involve filtering the contaminant-bound dendrimers, and comprise using a process selected from the group consisting of pressure, vacuum, gravity, and combinations thereof.

Other embodiments povide methods wherein filtering the contaminant-bound dendrimers further includes using a filtration filter selected from the group consisting of nanofilters, ultrafilters, microfilters, and combinations thereof.

Other embodiments provide methods wherein the dendrimer agent comprises a quantity of a tecto-dendrimer or a linear-dendritic copolymer.

Additional embodiments provide methods wherein the dendrimer agent comprises a quantity of a dendrimer selected from the group consisting of cation-binding dendrimers, anion-binding dendrimers, organic compound-binding dendrimers, redox-active dendrimers, biological compound-binding dendrimers, catalytic dendrimers, biocidal dendrimers, viral-binding dendrimers, multi-functional dendrimers, and combinations thereof.

Certain embodiments of the invention provide methods wherein the dendrimer is a cation-binding dendrimer that binds a metal that is selected from the group consisting of copper, cobalt, nickel, lead, cadmium, zinc, mercury, iron, chromium, silver, gold, cadmium, iron, palladium, platinum, gadolinium, uranium, arsenic, and combinations thereof.

Other embodiments relate to methods wherein the contaminant-bound dendrimers are subjected to a recycling reaction to separate at least a portion of the contaminants from at least a portion of the contaminant-bound dendrimers to produce a quantity of contaminants and a quantity of unbound dendrimers, and further comprising recycling the quantity of unbound dendrimers.

Another embodiment of the invention relates to a water filtration system, comprising a reaction unit including a quantity of a dendrimer agent and a filtration unit in fluid communication with the reaction unit.

Other embodiments relate to a water filtration system wherein the filtration unit comprises a filter selected from the group consisting of nanofilters, ultrafilters, microfilters, and combinations thereof.

Still further embodiments pertain to a water filtration system wherein the reaction unit and the filtration unit are integrated.

Additional embodiments of the invention relate to a water filtration system wherein the dendrimer agent comprises a quantity of a tecto-dendrimer or linear-dendritic copolymer.

Further embodiments relate to a water filtration system wherein the dendrimer agent comprises a quantity of a dendrimer selected from the group consisting of cation-binding dendrimers, anion-binding dendrimers, organic compound-binding dendrimers, redox-active dendrimers, biological compound-binding dendrimers, catalytic dendrimers, biocidal dendrimers, viral-binding dendrimers, multi-functional dendrimers, and combinations thereof.

Still further embodiments relate to a water filtration system comprising a dendrimer recovery unit in fluid communication with the filtration unit and configured to implement a recycling reaction to recycle a quantity of dendrimers.

Another embodiment relates to a water filtration system wherein the filtration unit and the dendrimer recovery unit are integrated.

Certain embodiments of the invention relate to a method of binding contaminants in water, comprising providing a quantity of contaminated water, and contacting the contaminated water with a dendrimer agent.

Another embodiment relates to a method wherein the dendrimer agent comprises a quantity of a dendrimer selected from the group consisting of tecto dendrimers, linear-dendritic copolymers, cation-binding dendrimers, anion-binding dendrimers, organic compound-binding dendrimers, redox-active dendrimers, biological compound-binding dendrimers, catalytic dendrimers, biocidal dendrimers, viral-binding dendrimers, multi-functional dendrimers, and combinations thereof.

DETAILED DESCRIPTION OF THE INVENTION

The invention disclosed herein relates to a novel process useful for the removal of contaminants from water. The process, referred to as "dendrimer-enhanced filtration" (DEF) uses dendritic macromolecules, or dendrimers, and a filtration step to produce filtered water.

Figure 1:
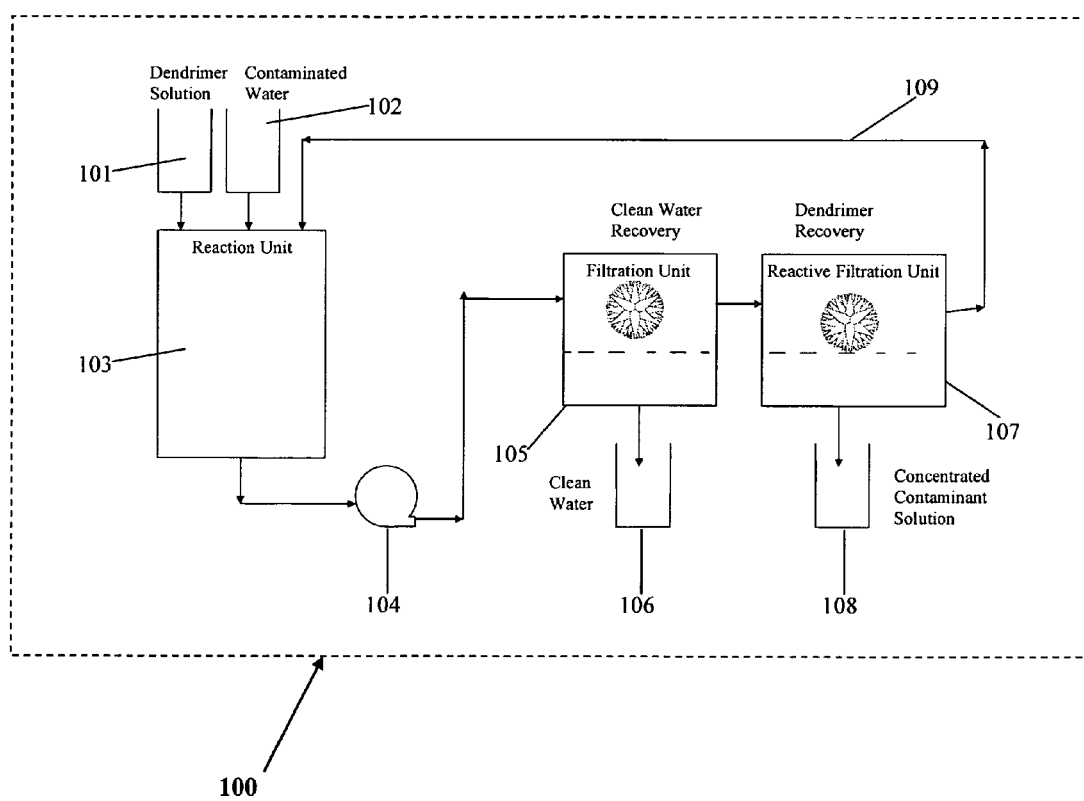
FIG. 1 shows a sample embodiment of a dendrimer-enhanced filtration system in accordance with an embodiment of the present invention.

The DEF process, as shown in FIG. 1, is structured around three unit operations: 1. a reaction unit; 2. a filtration unit, and 3. a dendrimer recovery unit. In the reaction unit (103), contaminated water (102) is mixed with a solution of functionalized dendritic polymers (101) to carry out any of a number of specific reactions of interest, including metal ion chelation, organic compound solubilization, contaminant oxidation-reduction, contaminant hydrolysis, binding of anions, and microbial/viral disinfection. Following completion of the binding of the contaminants and/or the reaction, the resulting solution is passed through a filter in the filtration unit (105), producing a quantity of treated water (106). A Pump, (104) or a plurality of pumps (not shown), may be used at a number of different stages of the process to promote flow of the reaction components to various regions of the system. The contaminant laden dendrimer solutions are subsequently sent to an optional dendrimer recovery unit (107), where the dendritic polymers, and if desired, the contaminants that were bound to the dendrimers (108), are recovered. The recycled dendrimers may be recycled back into the reaction unit (109). The recovered contaminants may be otherwise disposed of or utilized. The term "system" (100) refers to the overall DEF process, which may have any number or combination of some or all of the components described above or hereafter.

Dendrimers are a useful molecule for this purpose. Unlike micellar surfactant solutions, aqueous solutions of dendritic polymers contain covalently globular nanostructures. Because of their polydispersity and persistent globular shape over a broad range of solution pH and background electrolyte concentration, the leakage of dendritic polymers through filtration membranes with the appropriate molecular weight cut-off (MWCO) is highly improbable. Dendritic polymers also have much less tendency to pass through filtration membranes than linear polymers of similar molar mass because of their much smaller polydispersity and globular shape. Whereas the intrinsic viscosity of a linear polymer increases with its molar mass, that of a dendrimer decreases as it adopts a molar globular shape at higher generations (Fréchet and Tomalia, (2001) *Dendrimers and other Dendritic Polymers*; John Wiley and Sons). Because of this, dendrimers have a much smaller intrinsic viscosity than linear polymers with similar molar mass. Thus, comparatively smaller operating pressure, energy consumption and loss of ligands by shear-induced mechanical breakdown can be achieved with dendrimers in tangential/cross-flow pressure driven filtration systems typically used in water purification. Dendritic polymers can be designed to incorporate a wide variety of different functional groups that facilitate binding and/or reaction with a wide range of different type of contaminants. Table 1 shows some examples of different types of dendrimer reactive groups and their target contaminants; the list is by no means exhaustive.

Figure 2:
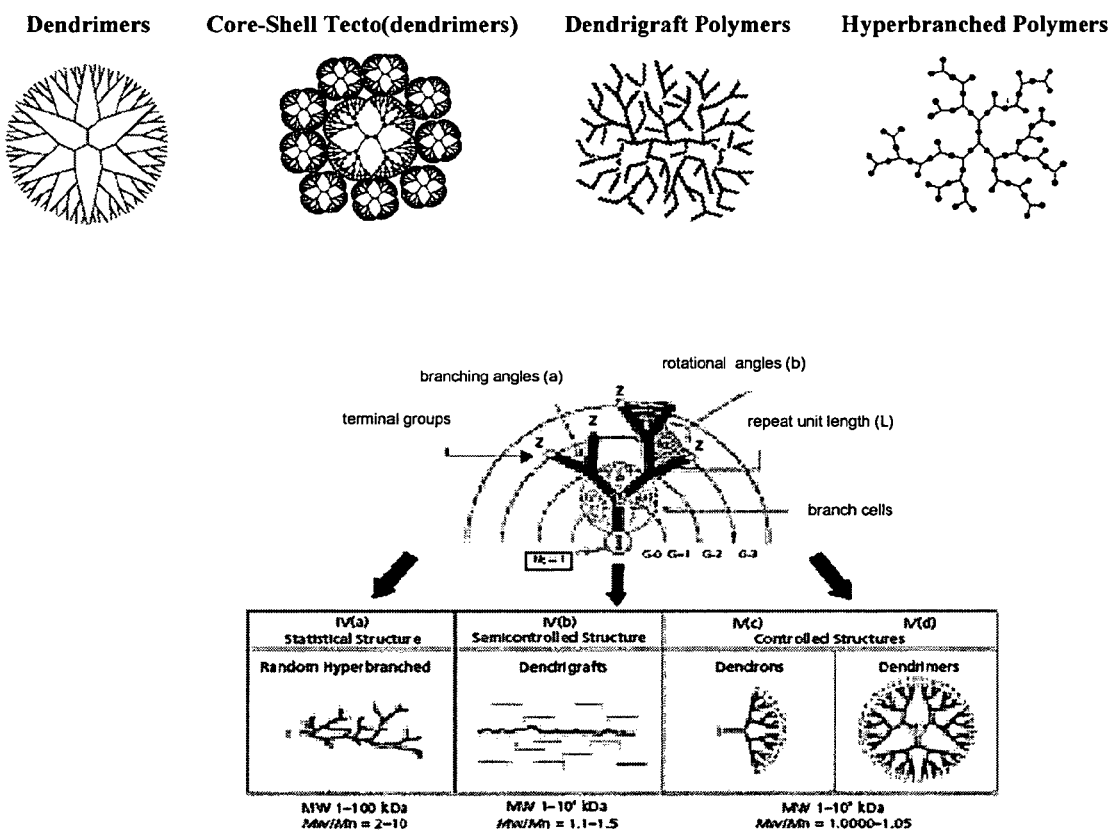
FIG. 2 shows examples of different types of dendrimers in accordance with an embodiment of the present invention.

A useful type of dendrimer is a poly(amidoamine) (PAMAM) dendrimer with an ethylene diamine (EDA) core. PAMAM dendrimers possess functional nitrogen and amide groups arranged in regular "branched upon branched" patterns which are displayed in geometrically progressive numbers as a function of generation level (FIG. 2). The high density of nitrogen ligands enclosed within a nanoscale container makes PAMAM dendrimers particularly attractive as high capacity chelating agents for metal ions in aqueous solutions.

Commercially available PAMAM dendrimers may be used to develop efficient, cost effective and environmentally-acceptable chelating agents for removing arsenic, cadmium, chromium, copper, lead, mercury and the toxic fluoride ion ($F^-$) from contaminated water. To this end, $NH_2$-terminated G3, G4 and G5 PAMAM dendrimers with an ethylene

TABLE 1

Dendrimer Active Groups, Target Contaminants, and Recycling System

| Active Groups | Target Contaminants |
| --- | --- |
| Amines, Hydroxyl, Carboxyl, TRIS, Succinamic acid, Carbomethoxy pyrrolidinone, Oxalate, Imidazole and other N, O, P and S containing dendrimer terminal and internal groups. | Ag(I), Au(I) Cu(II), Ni(II), Co(II), Pd(II), Pt(II), Mn(II) Fe(III), Co(III), Gd(III), U(VI), etc |
| Transition metal ions, Redox active organic groups, Catalytic organic groups, etc. | Water soluble reactive organic and inorganic compounds, redox active metal ions, anions, organic and inorganic solutes, etc. |
| Complexes with transition metal ions (Ag(I), Cu(II), etc), Bioactive organic groups, | Bacteria |
| Hydrophobic core | Viruses, etc |
| Hydrophobic shell | Water soluble organic solutes |
| Alkyl amines, Trialkyl amines, Amide NH groups, Pyrrole NH groups, Quaternary amoninum chlorides, Complexes with transition metal ion (Cu(II) | Water soluble anions |

The term "dendrimer", or "dendritic macromolecule", refers to 3-D globular macromolecules that may have three covalently bonded components: a core, interior branch cells and terminal branch cells. For the purpose of this application, dendrimers include hyperbranched polymers, dendrigraft polymers, tecto-dendrimers, core-shell(tecto)dendrimers, hybrid linear-dendritic copolymers, dendronized polymers, dendrimer-based supramolecular assemblies and dendrimer-functionalized solid particles. FIG. 2 shows some examples of different types of dendrimers. They may be functionalized with surface groups that make them soluble in appropriate media or facilitate their attachment to appropriate surfaces. They may be bioactive dendrimers, as later defined herein.

The term "dendrimer agent" refers to a chemical composition containing dendrimers. The dendrimer agent may comprise a single dendrimer with a single functionality, a single dendrimer with multiple functionalities, a mixture of dendrimers, dendrimers that have been cross-linked to other dendrimers (tecto-dendrimers, or megamers), and dendrimers that have been covalently linked to polymers to produce linear-dendritic copolymers or dendronized linear polymers.

A dendrimer agent may also include buffers, salts, stabilizers or inert ingredients, and may be provided in a number of forms, including but not limited to solids, solutions, suspensions, gels, semi-liquids, and slurries. As will be recognized by one of skill in the art, there is a variety of different dendrimer agent compositions that would be suitable for the system and would therefore fall within the scope of the present invention.

diamine (EDA) core may be reacted with the appropriate reagents to build PAMAM dendrimers with various terminal groups that are optimizable and have binding specificities that target toxic metal ions and inorganic contaminants. The dendrimer terminal groups may include hydroxide, acetamide, carboxylate, phosphonate, sulfonate and quaternary amine (methyl). In all cases, the chemical compositions of the surface modified dendrimers may be monitored by FTIR/$^{13}$C NMR spectroscopy and size exclusion chromatography. The molar masses of the surface modified PAMAM dendrimers may be determined by matrix assisted laser desorption (MALDI)-time of flight (TOF) mass spectrometry (MS) and gel electrophoresis.

A system for carrying out the process of DEF may comprise a number of different components or units. The term "reaction unit" refers to a component of a water filtration system where dendrimers and contaminated water are mixed. The reaction unit may contain a single type of dendrimer, or a mixture of different types of dendrimers, as well as multifunctional dendrimers. In some cases, the dendrimers and the contaminated water undergo a reaction, such as binding or catalysis, and the reaction unit may be subjected to conditions that facilitate a such a reaction. Such conditions include but are not limited to elevated or reduced temperature and elevated or reduced pH.

As used herein, the term "contaminated water" refers to water that contains a substance, or contaminant, that binds to or undergoes a reaction catalyzed by a dendrimer. Possible substances include but are by no means limited to metal ions, anions, organic compounds, bacteria, viruses, and biological compounds such as proteins, carbohydrates, and nucleic acids. Contaminants are often toxic chemicals found in the environment that need to be removed from water in order to make it potable. Examples of toxic compounds that may be removed or treated by a DEF system include copper, polychloroethelene, perchlorate, arsenate, chromium, and lead. The term "treated" or "filtered" water refers to water from which contaminants have been removed or catalytically modified.

The term "filtration unit" refers to a component of a water filtration system wherein contaminated water that has been contacted with a dendrimer agent is filtered such that water and free contaminants are filtered out, but dendrimers and dendrimers with bound contaminants are retained on one side. It may also be referred to as a "clean water recovery unit". The filter in the filtration unit is referred to as the "filtration unit filter". The solution that passes through the membrane is referred to as the "filtrate". The goal of the filtration unit is to produce "clean" water; water from which a measurable, and in some cases substantial amounts contaminants have been removed by the dendrimers. It is within the scope of the application to have the reaction unit integrated with the filtration unit. As used herein, the term "integrated" refers to multiple components that are mechanically interconnected such as in a single physical unit.

The term "filter" refers to an entity that is often a physical barrier, that retains some molecules or compounds while allowing others to pass through. In some cases, the selection of what passes through the filter is based on size; for example, a filter retains larger compounds and molecules while allowing smaller ones to pass through. An example of a simple size-based filter is a porous membrane. Membrane based systems may be suitable for use in DEF, as a membrane may be used that has a smaller pore size than the dendrimers, so that dendrimers and dendrimers with bound contaminants are retained by the membrane, while water from which the contaminants have been removed passes through as a filtrate.

Figure 3:
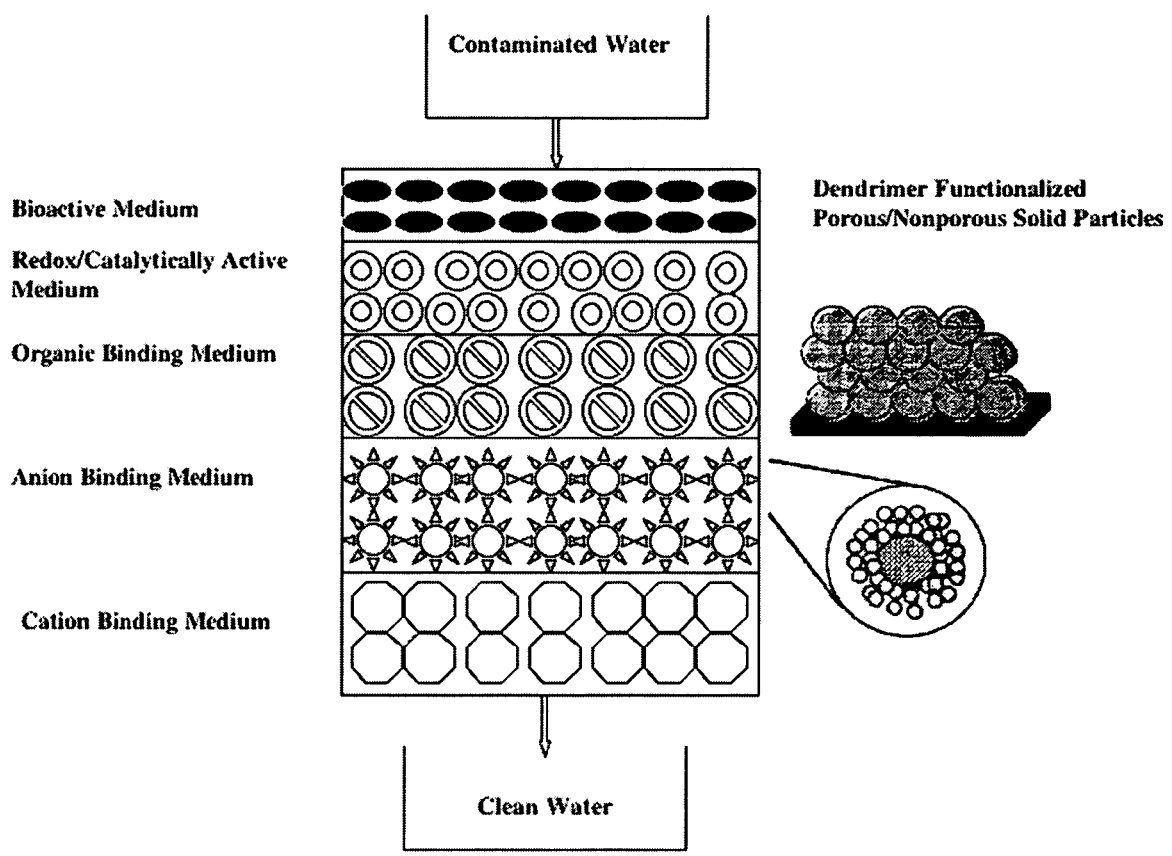
FIG. 3 shows an example of a composite solid-supported filter for purification of water contaminated by mixtures of cations, anions, organic/inorganic solutes, bacteria and viruses in accordance with an embodiment of the present invention.

An alternative type of filter is one in which the filtering entity is in contact with a solid support or matrix. In this situation, dendrimers may be attached to or deposited on a surface of a solid matrix. For example, with PAMAM dendrimers, the chemistry of the terminal groups may be used to either covalently or non-covalently attach the dendrimers to a solid support. Contaminated water is provided to the dendrimer/matrix assembly, and binding of the contaminants to the dendrimer occurs. Water from which at least a portion of the contaminants have been removed is produced. Solid-supported filters may include a number of different dendrimers and dendrimer types, including but in no way limited to cation/anion selective ligands, redox active metal ions and clusters, catalytically active metal ions and clusters, hydrophobic cavities, and bioactive agents. An example of a solid-supported filter is shown in FIG. 3.

Thus, the term "filter" encompasses but is not limited to membranes and solid-support filters. It is also possible that a system has both a membrane filter and a solid supported filter in the same unit, or in separate units operated in parallel or in series.

The filtration process, which separates the free dendrimers and contaminant-bound dendrimers from the filtered water, may be driven by pressure, vacuum, or gravity. If pressure is used, it may be applied to the side of the membrane containing the dendrimers to increase the flow of filtrate through the membrane. Pressure may be generated by the addition of gas pressure, or may be mechanically applied. A vacuum may be applied to the side of the membrane opposite of the dendrimer-containing side, to increase the flow rate from the other side of the membrane. Filtration may also occur by simple gravity. In addition, combinations of pressure, vacuum, and gravity may be used.

Depending on the size and type of the dendrimers used in the system, the pore size of the filter may vary. Examples of different filter sizes are as follows: nanofilters, used for nanofiltration (NF), ultrafilters, used for ultrafiltration (UF), and microfilters, used for microfiltration (MF). Nanofilters may have a pore size that is less than about 2 nanometers (nm) in diameter. Ultrafilters may have a pore size ranging from about 2 to 20 nm, which may be useful for non-cross-linked dendrimers. Microfilters may have membranes with pores larger than 20 nm, which may be particularly useful for retaining cross-linked dendrimers (tecto-dendrimers) or megamers. In general, the larger pore size of MF membranes allow a faster flow rates than the UF and NF membranes.

The "dendrimer recovery unit" or "recycling unit" is a component of a water filtration system wherein at least a portion of the contaminants that were bound to dendrimers earlier in the process are then separated from the dendrimers, producing a quantity of unbound dendrimers and a quantity of contaminant. Following removal of the contaminants from the dendrimers, the dendrimers may be re-used in future rounds of water filtration. Additionally, the contaminants may be recovered in the recycling process. In some circumstances, such as with valuable metals like copper, recovery the "contaminants" may especially desirable.

The term "recycling reaction" refers to any process by which contaminant-bound dendrimers are recycled, recovered, regenerated, or otherwise returned to a state that is useful for binding contaminants. In cases where the binding capacity of the dendrimers exceeds the amount of contaminants in the solution, thereby leaving a portion of dendrimers un-bound following the reaction unit step, the un-bound dendrimers may be subjected to a recycling reaction along with the contaminant-bound dendrimers. The type of recycling reaction used depends on the nature of the interaction between the contaminant and the dendrimer. Recycling processes suitable for various dendrimer types are described below; although one of skill in the art will readily recognize a number of variations and additional processes that may be readily implemented, and are considered to be within the scope of the present invention. The recycling reaction may take place in the dendrimer recovery unit, or in an integrated system, such as one where the filtration unit and the dendrimer recovery unit share the same membrane or filter.

In many cases, it is useful to formulate mixtures of dendritic polymers with different functionalities to treat water contaminated by multicomponent mixtures of chemical and biological contaminants. In cases where multi-component dendrimer agents are used, it may be desirable to have multiple dendrimer recovery units, although this is not required. If multiple dendrimer recovery units are used, they may be configured in series or in parallel.

In some cases, it may not be possible or desirable to recycle the dendrimers. For example, if the compounds that are bound in the dendrimers in the reaction unit are radioactive, or pose some other sort of environmental hazard, it may be desirable for the contaminant-bound dendrimers to be used only once.

It is also possible and well within the scope of the present invention to have systems wherein the filtration unit and the dendrimer recovery unit are integrated, or are a single unit. In the case of a membrane filter, a single membrane may used in both processes. In the case of a solid-support filter, the same unit may be subjected to different conditions to promote either retention or recovery of contaminants.

There are many types of water treatment processes, and within these treatment processes, there are many stages where it is desirable to remove specific contaminants from water. The US Environmental Protection Agency is evaluating a number of alternative water purification systems for small communities (US EPA (1998) Office of Water Report EPA 815-R-98-002). These include package treatment plants (i.e., factory assembled compact and ready to use water treatment systems), point-of-entry (POE) and point-of-use (POU) treatment units designed to process small amounts of water entering a given unit (e.g., building, office, household, etc) or a specific tap/faucet within the unit. The DEF processes and systems comprising the inventive DEF methods are readily adaptable for these types of water treatment systems.

DEF processes and systems have the potential to be flexible, reconfigurable, and scalable. The process is scalable; it is limited only by very few factors (e.g., by the size of or number of filters or membranes) as will be readily appreciated by those of skill in the art. The flexibility of DEF is illustrated by its adaptability to a modular design approach. DEF systems may be designed to be "hardware invariant" and thus reconfigurable in most cases by simply changing the dendrimer agent and dendrimer recovery system for the targeted contaminants. Thus, DEF may be used in small mobile membrane-based water treatment systems as well as larger and fixed treatment systems and a host of other commercial, residential, and industrial applications.

Dendrimer-enhanced filtration is a useful tool for removing cations from aqueous solutions. More specifically, dendrimers may be used to form complexes with metal ions. Diallo et al. (Diallo, M. S. et al. (2005), *Envir. Sci. Technol.*, 39: 1366-1377), have recently shown that DEF is more effective than polymer-supported ultrafiltration (PSUF) at recovering metal ions such as Cu(II) from contaminated water. In PSUF, a water-soluble linear polymer with strong binding affinity for the target metal ions is added to contaminated water [Geckeler, K. E and Volcheck. K. (1996), *Envir. Sci. Technol.*, 30:725-734., Juang R. S. and Chen, M. N. (1997), *Ind Eng. Chem.*, 36: 179-186., Juang R. S. and Chiou, C. H. (2000), *J Membrane Sci.*, 177:207-214.). The resulting solution is passed through an ultrafiltration membrane with pore sizes smaller than those of the metal ion-polymer complexes.

Metal ion complexation is an acid-base reaction that depends on several parameters including (i) metal ion size and acidity, (ii) ligand basicity and molecular architecture and (iii) solution physical-chemical conditions. Three important aspects of coordination chemistry are the Hard and Soft Acids and Bases (HSAB) principle, the chelate effect and the macrocyclic effect (Martell and Hancock, (1996) *Metal Complexes in Aqueous Solutions*; Plenum Press: New York.). The HSAB principle provides "rules of thumb" for selecting an effective ligand (i.e., Lewis base) for a given metal ion (i.e., Lewis acid). Table 2 shows the binding constants of metal ions to selected unidendate ligands. The OH⁻ ligand is representative of ligands with negatively charged "hard" 0 donors such as carboxylate, phenolate, hydroxymate, etc (Martell and Hancock, (1996) *Metal Complexes in Aqueous Solutions*; Plenum Press: New York., Hancock and Martell (1996) *J. Chem. Edu.* 73:654.). Conversely, $NH_3$ is representative of ligands with "hard" saturated N donors (e.g. aliphatic amines); whereas imidazole is representative of "border line" hard/soft ligands with unsaturated N donors (Martell and Hancock, (1996) *Metal Complexes in Aqueous Solutions*; Plenum Press: New York.). The mercaptoethanol group ($HOCH_2CH_2S^-$), on the other hand, is representative of ligands with "soft" S donors such as thiols (Martell and Hancock, (1996) *Metal Complexes in Aqueous Solutions*; Plenum Press: New York., Hancock and Martell (1996) *J. Chem. Edu.* 73:654.).

TABLE 2

Binding Constants of Selected Metal Ions to Unidendate Ligands

| Metal Ion | $\log K_1$ (OH⁻) | $\log K_1$ ($NH_3$) | $\log K_1$ (Imidazole) | $\log K_1$ $HOCH_2CH_2S^-$ |
|---|---|---|---|---|
| Cu(II) | 6.30 | 4.04 | 3.76 | 8.10 |
| Co(II) | 3.90 | 2.10 | 1.63 | 3.06 |
| Ni(II) | 4.10 | 2.70 | 1.92 | 3.14 |
| Pb(II) | 6.30 | 1.60 | 2.04 | 5.71 |
| Cd(II) | 3.9 | 2.55 | 2.54 | 7.45 |
| Zn(II) | 5.00 | 2.21 | 1.86 | 3.19 |
| Hg(II) | 10.60 | 8.8 | 8.68 | 27.21 |
| Fe(II) | 3.60 | 1.4 | 1.41 | 2.9176 |
| Fe(III) | 11.81 | 3.8 | 3.51 | 8.5885 |
| Cr(III) | 10.07 | 3.40 | 3.05 | 7.3741 |
| Ag(I) | 2.00 | 3.30 | 3.43 | 11.3369 |
| Au(I) | 2.70 | 5.6 | 5.63 | 18.769 |
| Na(I) | −0.20 | −1.1 | −1.50 | −4.72 |
| Mg(II) | 2.58 | 0.23 | −0.01 | −1.42 |
| Ca(II) | 1.30 | −0.2 | 0.06 | −0.07 |

Consistent with the HSAB principle, Table 2 shows that soft metal ions such as Hg(II) and Au(I) tend to form more stable complexes with ligands containing S donors. Conversely, hard metal ions such Fe(III) tend to prefer hard ligands with O donors; whereas borderline hard/soft metal ions such as Cu(II) can bind with soft/hard ligands containing N, O and S donors depending on their specific affinity toward the ligands.

The chelate effect is predicated upon the fact that metal ions form thermodynamically more stable complexes with ligands containing many donor atoms than with unidentate ligands (Martell and Hancock, (1996) *Metal Complexes in Aqueous Solutions*; Plenum Press: New York.). Conversely, the macrocyclic effect highlights the fact that metal ions tend to form thermodynamically more stable complexes with ligands containing preorganized cavities lined with donors (i.e., Lewis bases) than with multidendate and unidentate ligands (Martell and Hancock, (1996) *Metal Complexes in Aqueous Solutions*; Plenum Press: New York.).

Dendritic macromolecules provide ligand architecture and coordination chemistry for metal chelation. Although macrocyles and their "open chain" analogues (unidentate and polydentate ligands) have been shown to form stable complexes with a variety of metal ions (Martell and Hancock, (1996) *Metal Complexes in Aqueous Solutions*; Plenum Press: New York.), their limited binding capacity (i.e. 1:1 complexes in most cases) is a major impediment to their utilization as high capacity chelating agents for environmental separations such as water purification. Their relatively low molecular weights also preclude their effective recovery from wastewater by low cost membrane-based techniques (e.g., ultrafiltration and nanofiltration).

During the last 10 years, substantial research efforts have been devoted to the evaluation of the commercially available poly(amidoamine) (PAMAM) dendrimers from Dendritic Nanotechnologies (DNT) and Dendritech, and the ASTRAMOL poly(propyleneimine) imines (PPI) dendrimers from DSM as (i) high capacity chelating agents, (ii) metal ion contrast agent carriers for magnetic resonance imaging and (iii) templates for the synthesis of metal bearing nanoparticles with electronic, optical and catalytic activity. These studies provide key data and insight into the selection of water soluble and recyclable dendrimers with high binding capacity and selectivity toward a broad range of metal ions including Cu(II), Ni(II), Co(II), Pd(II), Pt(II), Zn(II), Fe(III), Co(III), Gd(III), U(VI), Ag(I), Au(I), etc.

Other commercially available dendritic polymers that could be used as metal ion chelating agents include: 1. the water soluble phosphorous dendrimers available from Dendrichem and 2. the HYBRANE™ polyester amide hyperbranched polymers from DSM. Also applicable to the present invention is the recent development of a click chemistry route for the synthesis of low cost Priostar dendrimers by DNT. According to DNT, this synthetic method will allow "the introduction and control of six critical nanostructure design parameters that may be used to engineer over 50,000 different major variations of sizes, compositions, surface functionalities and interior nanocontainer spaces that are expected to offer new properties for use in a wide variety of commercial applications". In addition, Priostar dendrimers may provide a broad range of low-cost and high capacity/selectivity recyclable dendritic chelating agents for water purification; they are suitable for use in connection with alternate embodiments of the present invention and are thus considered to be within the scope thereof. Table 3 provides a list of some, but not all, commercially available dendritic polymers that may be used as high capacity and recyclable chelating agents for water purification by dendrimer-enhanced filtration in accordance with various embodiments of the present inventions.

TABLE 3

Commercially available dendritic polymers that may be used as high capacity and recyclable chelating agents for water purification by dendrimer enhanced filtration (DEF).

| Dendrimer | Manufacturer | Reactive Groups | Metal Ions |
| --- | --- | --- | --- |
| PAMAM dendrimers | Dendritic Nano Technologies Dendritech USA | amines, hydroxyl, carboxyl, TRIS, succinamic acid, etc | Ag(I), Au(I) Cu(II), Ni(II), Co(II), Pd(II), Pt(II), Mn(II) Fe(III), Co(III), Gd(III), U(VI), etc |
| ASTRAMOL PPI dendrimers | DSM Netherlands | amines, hydroxyl, carboxyl, etc | Ag(I), Cu(II), Ni(II), Co(II), Fe(III), Gd(III), etc |
| Priostar Dendrimers | Dendritic Nano Technologies | amines, hydroxyl, carboxyl, ethers, esters, thiol, imidazole, etc | Ag(I), Au(I) Cu(II), Ni(II), Co(II), Pd(II), Cd(II), Hg(II) Pt(II), Zn(II) Fe(II), Pb(II), Fe(III), Co(III), Gd(III), Cr(III), Cr(VI). As(III), As(V), U(VI), etc |
| Phosphorous Dendrimers | Dendrichem France | Phosphate | As(III), Hg(II) and Cd(II) |

While a number of suitable recycling reactions may be effective at regenerating metal ion-binding dendrimers, certain embodiments comprise protonating the dendrimer ligands by lowering the pH.

Dendrimer-enhanced filtration is a useful tool for removing organic solutes from aqueous solutions. The release of anthropogenic organic compounds (e.g., solvents, dyes, plastics, herbicides, pesticides and pharmaceuticals) into the environment is having a major impact on water quality throughout the world (Schwarzenbach, et al. (2003), *Environmental Organic Chemistry*, 2d. Ed). Because micelles provide a compatible nanoenvironment for the partitioning of organic solutes, aqueous solutions of surfactants above their critical micelle concentration (CMC) can significantly enhance the solubility of organic pollutants in water (Diallo, M. S. (1995), *Solubilization of Nonaqueous Phase Liquids and Their Mixtures In Micellar Solutions of Ethoxylated Nonionic Surfactants*, PhD Dissertation, University of Michigan., Pennel, K. D, et al. (1997), *Environmental Science and Technology*, 31:1382., Diallo, M. S., et al. (1994), *Environmental Science and Technology*, 28:1829).

Several investigators have evaluated the utilization of micellar surfactant solutions to remove organic pollutants from contaminated groundwater and industrial wastewater (Dunn, R. O., Jr., et al. (1985), *Sep. Sci. Technol.*, 20:257-284., Purkait, M. K., et al., (2005), *J Membr. Sci.*, 250:47-59., Purkait, M. K., et al. (2005), *J Coll. Interf Sci.*, 285:395-402). In a typical micellar enhanced ultrafiltration (MEUF) process, a surfactant or an amphiphilic block copolymer is added to contaminated water (Dunn, R. O., Jr., et al. (1985), *Sep. Sci. Technol.*, 20:257-284., Purkait, M. K., et al., (2005), *J Membr. Sci.*, 250:47-59., Purkait, M. K., et al. (2005), *J Coil. Interf. Sci.*, 285:395-402). The resulting aqueous micellar solution is then passed through an ultrafiltration membrane with pore sizes smaller than those of the organic laden micelles.

Micelles are non covalently bonded aggregates; thus their solubilization capacity, size (i.e., aggregation number, micellar core volume, etc), shape (i.e., spherical versus cylindrical) and stability (i.e., aggregation versus separation) depend to large extent on solution physicochemical conditions (e.g., surfactant concentration, temperature, pH, etc). Because micellization involves free energies of the order of 10 RT (where R is the ideal gas constant and T is the solution temperature), micelles tend to be dynamic and flexible structures with finite lifetime (Puvvada, S. and Blankschtein, D., (1990), *J. Chem. Phys.*, 92:3710-3724., Israelachvili, J. N. (1992), *Intermolecular and Surface Forces*, $2^{nd}$ Ed). This makes their separation from aqueous surfactant solutions by ultrafiltration much more challenging.

Dendritic macromolecules, on the other hand, can be designed and synthesized as stable and covalently bonded micelle mimics that can encapsulate or binding organic solutes in aqueous and nonaqueous solutions (Zeng F. and Zimmerman, S. (1997), *Chem. Rev.*, 1681., Bosman, A. W., et al. (1999), *Chem. Rev.*, 99:1665., Tomalia, D. A., et al. *PNAS*, 99:5081-5087). Because of the persistent globular shape and low polydispersity, these micelle mimics can be easily separated from aqueous solutions by UF, NF, MF.

Tomalia et al (Tomalia, D. A., et al. (1990), *Angew. Chem.*, 102, 119) were among the first investigators to establish that dendritic macromolecules such as PAMAM dendrimers can encapsulate organic solutes. They successfully combined $^{13}$C NMR relaxation measurements to show that G4.5 (G4-COONa) and G5-NH2 PAMAM dendrimers can encapsulate organic molecules such as acetylsalicyclic acid and 2,4-dichlorophenoxyacetic acid in chloroform. Pistolis et al. (Pistolis, G., et al. (1997), *Langmuir*, 13:5870) combined UV-VIS absorption and fluorescence spectroscopy to investigate pyrene solubilization in aqueous solutions of G0, G1 and G2 PAMAM dendrimers. They found that the amount of pyrene solubilized increases linearly with dendrimer generation. Watkins et al. (1997, *Langmuir*, 13:5870) have evaluated the interactions of red nile (a probe that fluoresces intensely in hydrophobic lipids and organic solvents) with a series of modified PAMAM dendrimers that were prepared by replacing their EDA core with diaminoalkanes. Their measurements of the probe fluorescence spectra in dilute aqueous solutions of the modified PAMAM dendrimers showed significant emission for dendrimer G3(C12) (i.e., generation 3 G3 with a $C_{12}$ diaminoalkane core). Newkome et al. (Newkome, G. R., et al. (1991), *Angew. Chem.*, 30:1178) have synthesized a dendrimer with an alkane core and 36 carboxyl terminal groups that can bind hydrophobic probes such as phenol blue, 7-chlorotetracycline and diphenylhexatriene in aqueous solutions. Hawker et al. (Hawker, C. J., et al., (1993), *J. Chem. Soc. Perkin. Trans.*, 1287) also reported the synthesis of a dendrimer with a polyaromatic ether core and 32 carboxyl terminal groups that can solubilize hydrophobic organic compounds such as pyrene and 2,3,6,7-tetranitrofluorenone in aqueous solutions.

Dendritic macromolecules such as PAMAM dendrimers may also solubilize organic compounds through specific interactions with their amino groups. Kleinman et al. (Kleinman, M. H., et al. (2000), *J. Phys. Chem.*, B 104:11472-11479) have shown that 2-naphthol binds preferentially to the tertiary amine groups within the dendrimer interior. More recently, Caminade and Majoral (Caminade, A. M. and Majoral, J. P. (2005), *Progr. Polym. Sci.*, 30:491-505) have described the preparation of water-soluble phosphorous dendrimers that can bind organic solutes. These results show that dendritic macromolecules may be used as micelle mimics that are useful for recovering organic solutes from aqueous solutions by dendrimer enhanced filtration (DEF).

A number of different dendrimer agents may be suitable for use in a DEF system that is configured to remove organic solutes from aqueous solution. Table 4 lists some manufacturers that produce dendrimers that may be used. Dendrimers that are useful in this system may have a hydrophobic core, or hydrophobic exterior, as well as a hydrophilic core or a hydrophilic exterior. The uptake of organic solutes by dendritic macromolecules in aqueous solutions may occur through several mechanisms including: 1. hydrophobic partitioning into the micellar core/shell, 2. hydrogen bonding to the macromolecule internal and terminal groups and 3. specific interactions with the macromolecule internal and terminal groups.

The recycling reaction for organic compound-binding may vary according to how the compounds are bound to the dendrimer. Some possible recycling processes include but are not limited to 1) air stripping or vacuum extraction of the bound organic solutes, 2) pervaporation of the bound organic solutes, 3) release of the bound organic solutes by protonation or deprotonation of the dendritic micelle mimics followed by UF or NF and 4) extraction of the bound organic solutes using a solvent, including "green" solvents such as ionic liquids

TABLE 4

Commercially available dendritic macromolecules that may be used as dendritic micelle mimics for water purification by dendrimer enhanced filtration (DEF).

| Macromolecule | Manufacturer |
|---|---|
| PAMAM dendrimers | Dendritic Nano Technologies Dendritech USA |
| ASTRAMOL PPI dendrimers | DSM Netherlands |
| PAMAMOS-TMOS dendrimers | Dendritech USA |
| Priostar Dendrimers | Dendritic Nano Technologies |
| Phosphorous Dendrimers | Dendrichem France |
| HYBRANE Hyperbranched Polymers | DSM Netherlands |
| BOLTORN Dendritic Polymers | Perstop Sweden |

Dendrimers in a dendrimer-enhanced filtration system may be used to facilitate oxidations, reductions, or chemical transformations of contaminants in water. The contamination of groundwater by organic and inorganic pollutants has become a major problem in the US. In a study conducted by the National Research Council, the number of sites with contaminated groundwater has been estimated to range from 300,000 to 400,000 (National Research Council (1997) *Innovations in Groundwater and Soil Cleanup: From Concept to Commercialization*. National Academy press, Washington D.C.). Pollutants in groundwater include chlorinated alkenes such as perchloroethylene (PCE), poly(nitroaromatics) such as 6-trinitrotoluene (TNT)) and redox active metal ions and anions such as Cr(VI) and $NO_3$. However, most of these compounds may undergo reductive, oxidative and catalytic transformations in aqueous solutions.

Functionalized dendrimers that promote such transformations may be used as reactive media for remediation of groundwater and surface water contaminated by organic and inorganic solutes. Because of their well-defined size, shape and molecular composition, dendritic macromolecules provide opportunities for developing a new generation of redox active nanoparticles and catalysts for purification of water contaminated by reactive organic and inorganic solutes. As used herein, the term "redox" refers to chemical reactions that involve loss of one or more electrons by one molecule (oxidation) and simultaneous gain by another (reduction).

A number of redox active dendritic catalysts have been synthesized and characterized that would be useful in a DEF water filtration system. These include dendrimers with ferrocene terminal groups that can oxidize glucose or reduce nitrates (Astruc and Chardac, (2001) *Chem. Rev.* 101:2991; Ooe, M et al. (2004). *J. Am. Chem. Soc.* 126: 604; Astruc, D et al. (2003). *Macromolecular Symposia* 196:1). Knapen et al. (1994) (*Nature*. 372: 659) have reported the preparation of carbosilane dendrimers with diaminoarylnickel(II) terminal groups, and have found that the Ni(II) functionalized dendrimers catalyze the Karsch addition of tetrachloromethane to methacrylate. Vassilev and Ford (1999) (*J. Polym. Sci. Part A*. 37: 2727) found that complexes of Cu(II), Zn(II) and Co(III) with poly(propyleneimine) dendrimers catalyze the hydrolysis of p-nitrophenyl diphenyl phosphate (PNPDPP) in zwitterionic buffered aqueous solutions. PNPDPP is often used as simulant for the chemical warfare agent such as Sarin. A number of dendritic catalytic systems have also been successfully implemented in continuous membrane reactors (Astruc and Chardac, (2001) *Chem. Rev.* 101:2991).

In addition, several research groups have also exploited the unique properties of dendrimers as nanoscale metal ion containers to synthesize metal bearing nanoparticles with catalytic properties (Scott et al. (2005) *J. Phys. Chem. B*. 109:692; Esumi et al. (2004) *Langmuir*. 20:237). These nanoparticles, commonly referred to as dendrimer nanocomposites, can be efficiently prepared by reactive encapsulation, a process that involves the complexation of guest metal ions followed by their reduction and immobilization inside a dendritic host and/or at its surface.

The inventor has shown the use of the Fe(0)/Fe(II) and Fe(II)/Fe(III) redox systems to develop water soluble and solid-supported dendritic nanoparticles to demonstrate the potential usefulness of dendrimer nanocomposites and transition metal ion-dendrimer complexes in water purification The Fe(0)/Fe(II) and Fe(II)/Fe(III) redox couples can drive the oxidative and reductive transformations of a variety of organic/inorganic pollutants and toxic metal ions. Reactions of relevance to water purification of water include: 1) the reductive dehalogenation of chlorinated hydrocarbons such PCE, 2) the reduction of Cr(VI) to Cr(III) and 3) the oxidation of As(III) to As(V) in the presence of dissolved oxygen. He initially focused on the reductive dehalogenation of PCE by Fe(0) dendrimer nanocomposites in aqueous solutions (Example 4 includes data on the reduction of PCE by Fe(0) dendrimer nanocomposites).

The recycling reaction for redox active dendrimers may be accomplished by a number of means, including electrochemical regeneration. In such a reaction, the dendrimers may be placed in proximity to a an electrode, or redox couple that has a reduction potential that is favorable to oxidize or reduce the dendrimer catalyst to the state required for further rounds of catalysis. This may be accomplished in an electrochemical cell, where an electrical current is applied, or by reacting the dendrimers with another redox-active metal. In cases where the dendrimers carry out other types of catalytic reactions, different types of recycling processes may desriable, as will be readily appreciated by those of skill in the art.

Persons of ordinary skill in the art would recognize that a number of different redox-active dendrimer agents would be suitable for use in the water filtration system. A number of different commercial vendors may provide dendrimers with reactive groups including but not limited to transition metal ions, redox-active organic groups, and catalytic organic groups. The target contaminants for such dendrimers include but are not limited to water soluble reactive organic and inorganic compounds, redox active metal ions, anions, organic and inorganic solutes. Table 4 lists some commercially available dendrimers that may be used in the system.

The dendrimer-enhanced filtration process may be used to remove anions from water. Anions have emerged as major water contaminants throughout the world because of their strong tendency to hydrate. In the US, the discharge of anions such as perchlorate ($ClO_4^-$), pertechnetate ($TcO_4^-$), chromate ($CrO_4^{2-}$), arsenate ($AsO_4^{3-}$), phosphate ($HPO_4^{2-}$) and nitrate ($NO_3^-$) into publicly owned treatment works, surface water, groundwater and coastal water systems is having a major impact on water quality. While significant research efforts have been devoted to the design and synthesis of selective chelating agents for cation separations (Martell, A. E. and Hancock, R. D., *Metal Complexes in Aqueous Solutions*; Plenum Press: New York, 199, Hancock R. D. and Martell A. E. (1996), *J. Chem. Edu.*, 73:654), anion separations have comparatively received limited attention (Gloe, K., et al. (2003), *Chem. Eng. Technol.*, 26:1107).

Unlike cations, anions have filled orbitals and thus cannot covalently bind to ligands (Gloe, K., et al. (2003), *Chem. Eng Technol.*, 26:1107, Beer, P. D. and Gale, P. A. (2001), *Angew. Chem. Int. Ed. Engl.*, 40:487). Anions have a variety of geometries (e.g., spherical for $Cl^-$ and tetrahedral for $ClO_4^-$) and are sensitive to solution pH in many cases (Gloe, K., et al. (2003), *Chem. Eng. Technol.*, 26:1107, Beer, P. D. and Gale, P. A. (2001), *Angew. Chem. Int. Ed. Engl.*, 40:487). Thus, shape-selective and pH-responsive receptors may be used to effectively target anions. The charge-to-radius ratios of anions are also lower than those of cations (Gloe, K., et al. (2003), *Chem. Eng. Technol.*, 26:1107, Beer, P. D. and Gale, P. A. (2001), *Angew. Chem. Int. Ed. Engl.*, 40:487). Thus, anion binding to ligands through electrostatic interactions tends to be weaker than cation binding. Anion binding and selectivity also depend on (i) anion hydrophobicity and (ii) solvent polarity (Gloe, K., et al. (2003), *Chem. Eng Technol.*, 26:1107, Beer, P. D. and Gale, P. A. (2001), *Angew. Chem. Int. Ed. Engl.*, 40:487).

The instant application provides methods useful for removing anions from water. Dendrimers with reactive groups that promote anion binding include but are not limited to alkyl amines, trialkyl amines, amide NH groups, and pyrrole NH groups. Examples of anions that may be removed by a DEF process using anion-binding dendrimers include but are not limited to $ClO_4^-$, $TcO_4^-$, $CrO_4^{2-}$, $AsO_4^3$, $HPO_4^2$, and $NO_3^-$. An example of how perchlorate ($ClO_4^-$) may be separated from water is shown in the Examples.

The recycling reaction for anions-binding dendrimers may comprise deprotonating the dendrimer ligands by increasing the pH of the solution containing the dendrimers. Table 4 shows some of the commercially available dendrimers that are suitable for as anion-selective ligands for water purification by dendrimer enhanced filtration.

Dendrimer-enhanced filtration may be useful for binding to and reacting with biological entities such as bacteria and viruses, or subcellular components of biological entities including but not limited to nucleic acids, proteins, carbohydrates, lipids, and drugs. Such dendrimers may be referred to as "bioactive dendrimers".

The removal and deactivation of microbial and viral pathogens are critically needed to produce potable water. A variety of strong oxidants (e.g., chlorine and ozone) are used as disinfectants for pathogens (e.g., bacteria and viruses) in water treatment. Because these compounds tend to generate toxic disinfection byproducts such as trihalomethanes, haloacetic acids and aldehydes, alternative disinfectants are critically needed to comply with the Stage 1 Disinfection Byproduct Rule 1996 of the Safe Drinking Water Act (SDWA) Amendments (USEPA (1998) *Federal Register.* 63 (241): 69389). The mechanisms by which disinfectants such as chlorine inactivate water borne pathogens include: (1) impairment of pathogen cellular function by destruction of major constituents (e.g., cell wall), (2) interference with the pathogen cellular metabolic processes, and (3) inhibition of pathogen growth by blockage of the synthesis of key cellular constituents (e.g., DNA, coenzymes and cell wall proteins).

Because of their nanoscale size and high density of terminal groups, dendritic polymers provide useful platforms for targeting key biochemical constituents of water borne bacteria and viruses. Bielinska et al. (1997) (*Biochem. Biophys. Acta.* 1353:180) have reported that DNA and poly(amidoamine) PAMAM dendrimers form stable complexes through electrostatic interactions between negatively charged phosphate groups of the nucleic acid and protonated (positively charged) amino groups of the polymer.

Dendritic polymers are readily conjugated to antibodies and thus have the potential to target specific cells in vivo (Singh et al. (1994) *Clin. Chem.* 40:1845). They also offer non-toxic platforms for developing synthetic inhibitors to viruses by blocking their adhesion to biological substrates. Comb-branched and dendrigraft polymers conjugated to multiple sialic acid were evaluated for their ability to inhibit virus hemagglutination and to block infection of mammalian cells in vitro (Reuter et al. (1999) *Bioconjugate Chem.* 10:271). The tested viruses included: 1. influenza A H2N2, 2. X-31 influenza A H3N2, and sendai. The most effective virus inhibitors were the comb-branched and dendrigraft macromolecules, which showed up to 50000-fold increased activity against these viruses.

Recently, the pharmaceutical company Starpharma announced the successful development of a dendrimer-based biocide (VivaGel) that prevents HIV infection by binding to receptors on the virus's surface (Halford (2005) *Chem. & Eng. News* 83 (24): 30). Chen at al. (2000) (*Biomacromolecules.* 1:473) have reported that quaternary ammonium functionalized poly(propyleneimine) dendrimers are very potent biocides. Balogh et al. (2001) (*Nano Letters.* 1 (1): 18) have also shown that complexes of Ag(I) with PAMAM dendrimers and Ag(0)-PAMAM dendrimer nanocomposites display biocidal activity toward a wide range of bacteria including *Staphylococcus aureus, Pseudomonas aeruginosa,* and *Escherichia coli* bacteria.

Based on the research disclosed above, one of skill in the art would recognize that there are a number of different dendrimer systems and dendrimer modifications that could be used to bind and/or inactivate biological organisms or compounds. The recycling reaction for this type of dendrimer would depend on the chemistry involved in the binding between the dendrimer and the contaminant, but may include changes in pH, ionic strength, or reactions where the contaminant is competed away from the dendrimer by another compound.

The following examples are offered by way of illustration and not by way of limitation.

EXAMPLES

Example 1

Figure 4:
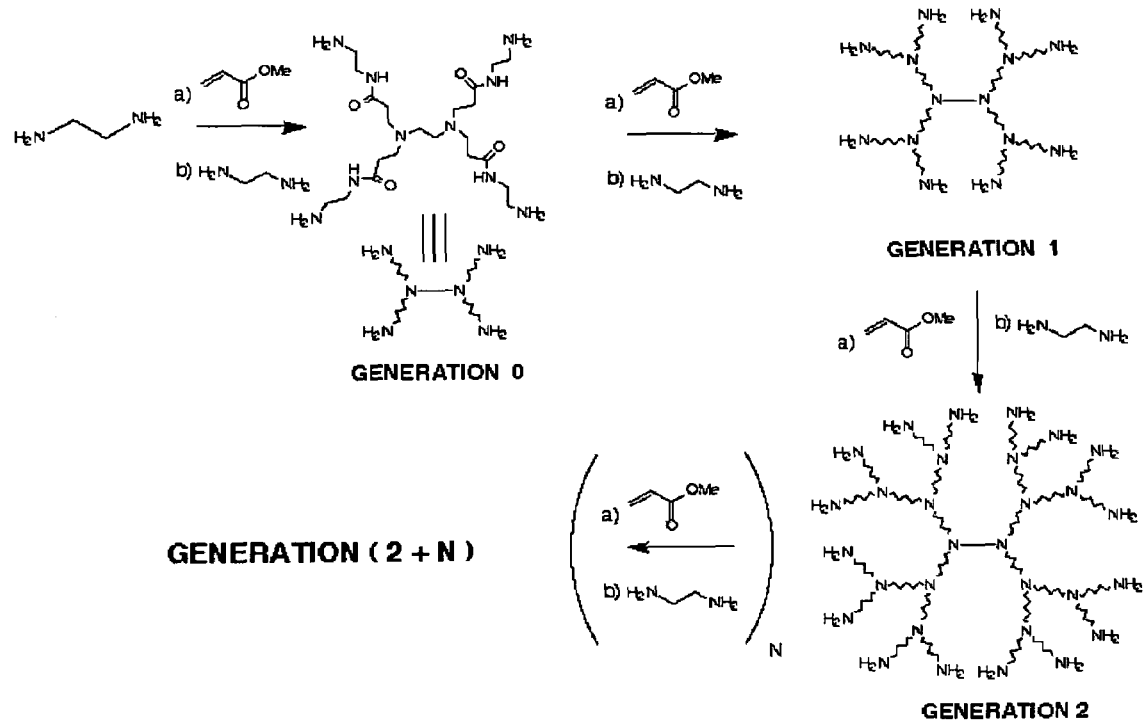
FIG. 4 shows some examples of structures of PAMAM Dendrimers with EDA Core and $NH_2$ terminal groups in accordance with an embodiment of the present invention.

Recovery of CU(II) from Aqueous Solutions Using PAMAM Dendrimers with Ethylene Diamine Core and Terminal $NH_2$ Groups PAMAM dendrimers with ethylene diamine (EDA) core and terminal $NH_2$ groups are synthesized via a two-step iterative reaction sequence that produces concentric shells of β-alanine units (commonly referred to as generations) around the central EDA initiator core (FIG. 4). Selected physicochemical properties of these dendrimers are given in Table 5.

TABLE 5

Selected Properties of EDA Core Gx-$NH_2$ PAMAM Dendrimers Evaluated in this Study.

| Dendrimer | $^aM_{wth}$ (Dalton) | $^bN_{NT}$ | $^cN_{NH2}$ | $^dpK_{NT}$ | $^epK_{NH2}$ | $^fR_G$ (nm) | $^gR_H$ (nm) |
|---|---|---|---|---|---|---|---|
| G3-$NH_2$ | 6906 | 30 | 32 | 6.52 | 9.90 | 1.65 | 1.75 |
| G4-$NH_2$ | 14215 | 62 | 64 | 6.85 | 10.29 | 1.97 | 2.5 |
| G5-$NH_2$ | 28826 | 126 | 128 | 7.16 | 10.77 | 2.43 | 2.72 |

$^aM_{wth}$: Theoretical molecular weight.
$^bN_{NT}$: Number of tertiary amine groups.
$^cN_{NH2}$: Number of primary amine groups.
$^dpK_{NT}$: pKa of dendrimer tertiary amine groups.
$^epK_{NH2}$: pKa of dendrimer primary amine groups.
$^fR_G$: dendrimer radius of gyration. For a dendritic polymer with N atoms and molar mass M, $R_G = \left(\frac{1}{M}\left\langle\sum_{i=1}^{N} m_i |r_i - R|^2\right\rangle\right)^{0.5}$; where R, i the center-of-mass of the dendrimer and $r_i$ and $m_i$ are, respectively, the position and mass of atom i of the dendrimer (Maiti, P. K., (2004) Macromolecules, 32:6236-6254.). The $R_G$ of the EDA Core Gx-$NH_2$ PAMAM dendrimers were estimated from small angle neutron scattering experiments (Dvornic, P. R. et al., (2001) Dendrimers and other Dendritic Polymers; Fréchet, J. M. J., Tomalia, D. A., Eds.; Wiley and Sons: New York.).
$^gR_H$: dendrimer hydrodynamic radius. It is usually estimated using Einstein's viscosity relation $R_H = \left(\frac{3\eta M}{10\pi N}\right)$ (Armstrong, J. K. et al., (2004) Biophys. J. 87:4259-4270.); where M is the molar mass of the particle/macromolecule, η is the intrinsic viscosity of its aqueous solution and N is Avogadro's number. The $R_H$ of the EDA Core Gx-$NH_2$ PAMAM dendrimers were estimated from dilute solution viscosity measurements (Dvornic, P. R. et al., (2001) Dendrimers and other Dendritic Polymers; Fréchet, J. M. J., Tomalia, D. A., Eds.; Wiley and Sons: New York.).

Diallo et al. (Diallo, M. S. et al., (2004) *Langmuir,* 20:2640-2651.) have recently carried out an extensive study of proton binding and Cu(II) complexation in aqueous solutions of EDA core PAMAM dendrimers of different generations (G3-$NH_2$, G4-$NH_2$ and G5-$NH_2$) and terminal groups (G4 PAMAM dendrimers with succinamic acid ($NHCOCH_2CH_2COOH$) terminal groups, glycidyol ($NHCH_2CH(OH)CH_2OH$) terminal groups and acetamide ($NHCOCH_3$) terminal groups. This publication is incorporated herein by reference. In consistence with Tanford's theory of solute binding to macromolecules (Tanford, C., (1961) *Physical Chemistry of Macromolecules;* John Wiley & Sons: New York.), they successfully used the extent of binding (EOB) to quantify Cu(II) uptake by the PAMAM dendrimers in aqueous solutions. The EOB of a metal ion in aqueous solutions of a dendrimer is readily measured by (i) mixing and equilibrating aqueous solutions of metal ion+ dendrimer, (ii) separating the metal ion laden dendrimers from the aqueous solutions by ultrafiltration (UF) and (iii) and measuring the metal ion concentrations of the equilibrated solutions and filtrates by atomic absorption spectrophotometry (Diallo, M. S. et al., (1999) *Environ. Sci. and Technol.* 33:820-824.-Diallo, M. S. et al., (2004) *Langmuir,* 20:2640-2651.). Table II compares the EOB of Cu(II) in aqueous solutions of EDA core Gx-$NH_2$ PAMAM dendrimers to the Cu(II) binding capacity of selected linear polymers with amine groups. On a mass basis, the EOB of Cu(II) to the Gx-$NH_2$ PAMAM dendrimers are much larger and more sensitive to solution pH than those of linear polymers with amine groups that have been used in previous PEUF studies (Geckeler, (1996) *Envir. Sci. Technol* 30, 725-734.).

Figure 5:
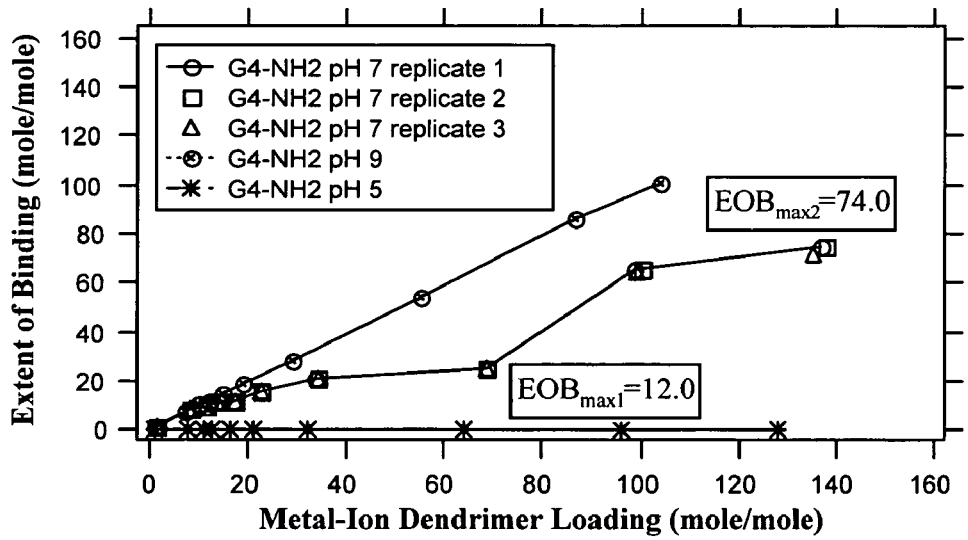
FIG. 5A shows the extent of binding of Cu(II) in aqueous solutions to EDA core G4-$NH_2$ PAMAM dendrimers as a function of metal ion dendrimer loading and solution pH in accordance with an embodiment of the present invention.
FIG. 5B shows the extent of binding of Cu(II) in aqueous solutions to G4-Ac($NHCOCH_3$) PAMAM dendrimers as a function of metal ion dendrimer loading and solution pH in accordance with an embodiment of the present invention.
Figure 5:
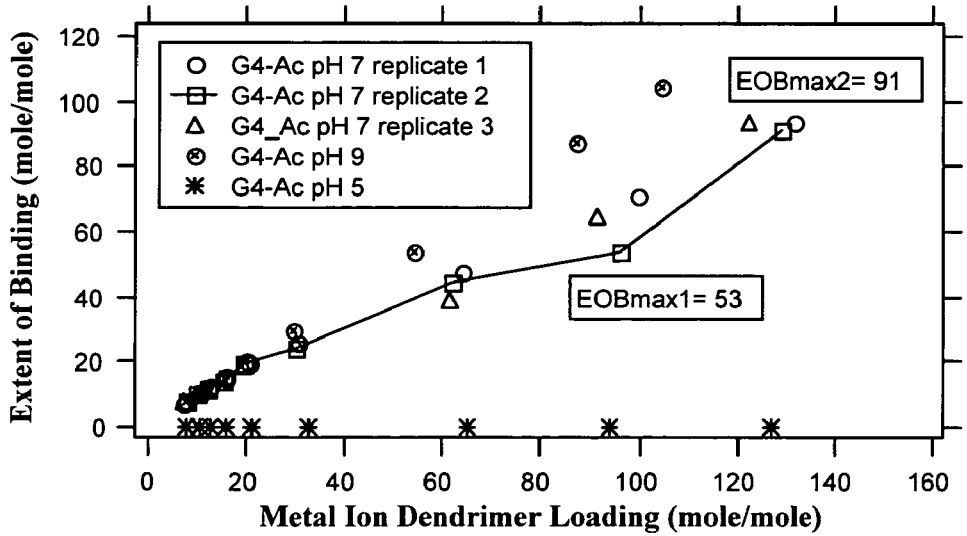

FIG. 5 provides evidence of the role of tertiary amine groups in the uptake of Cu(II) by EDA core PAMAM dendrimers in aqueous solutions. Both the G4-$NH_2$ and G4-Ac EDA core PAMAM dendrimers have 62 tertiary amine groups with pKa of 6.75-6.85. However, the G4-$NH_2$ PAMAM dendrimer has 64 terminal groups with pKa of 10.20. Conversely, the G4-Ac PAMAM dendrimer has 64 non ionizable terminal acetamide ($NHCOCH_3$) groups. At pH5.0, all the primary and tertiary amine groups of PAMAM dendrimers become protonated. FIG. 5 shows that no binding of Cu(II) occurs at pH 5 for both the G4-$NH_2$ and G4-Ac PAMAM dendrimers. Conversely, significant binding of Cu(II) is observed when a significant fraction or all of the dendrimer tertiary amine groups become unprotonated at pH 7.0 and 9.0.

To gain insight into metal ion coordination with the tertiary amine groups of PAMAM dendrimers, Extended X-Ray Absorption Fine Structure (EXFAS) spectroscopy was employed to probe the structures of aqueous complexes of Cu(II) with EDA core Gx-$NH_2$ PAMAM dendrimers at pH 7.0. Analysis of the EXAFS spectra suggests the formation of octahedral complexes in which a Cu(II) central metal ion is coordinated to 4 dendrimer tertiary amine groups and two axial water molecules inside the dendrimers.

To account for the Cu(II) ions that are not specifically bound to the dendrimers' tertiary amine groups at pH 7.0, it was hypothesized the formation of octahedral complexes of Cu(II) with water molecules trapped inside the Gx-$NH_2$ PAMAM dendrimers. A two-site thermodynamic model of Cu(II) binding to Gx-$NH_2$ PAMAM was subsequently formulated based on (i) the postulated mechanisms of Cu(II) coordination with the dendrimer tertiary amine groups and bound water molecules, and (ii) Tanford's theory of solute binding to macromolecules in aqueous solutions (Tanford, C., (1961) *Physical Chemistry of Macromolecules;* John Wiley & Sons: New York.). This model expresses the EOB of Cu(II) in aqueous solutions (at neutral pH) of Gx-$NH_2$ PAMAM dendrimers as function of metal ion-dendrimer loading ($N_{CuO}/N_d$), number of dendrimer tertiary amine group ($N_N^d$), number of water molecules bound to the dendrimers ($N_{H2O-d}$), metal ion amine group/bound water coordination numbers ($CN_{Cu(II)-N}^d$ and $CN_{Cu(II)-H2O}^d$) and the intrinsic association constants of Cu(II) to the dendrimer tertiary amine groups and bound water molecules ($k_{Cu(II)-N}^d$ and $k_{Cu(II)-H2O}^d$).

Figure 6:
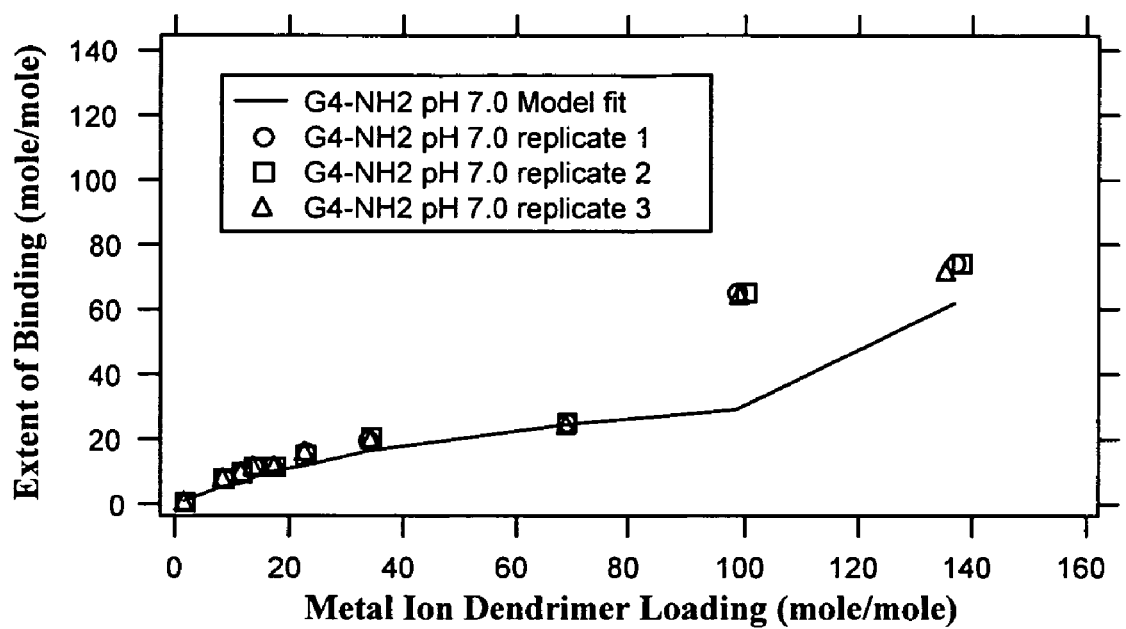
FIG. 6 shows a two-site model of Cu(II) uptake by G4-$NH_2$ PAMAM dendrimer in aqueous solutions in accordance with an embodiment of the present invention. The model fit was plotted against the measured extent of binding at room temperature and pH 7.0.

FIG. 6 highlights the results of a preliminary evaluation of the model. At low metal ion-dendrimer loadings, the model provides a good fit of the measured EOB of Cu(II) for the G4-NH$_2$ PAMAM dendrimer. The model also reproduces the increase in the EOB observed at higher metal ion-dendrimer loadings following the first plateau. Note that the two-site model can also be used to estimate the binding constant of Cu(II)

$$\left[ K_{Cu(II)-N}^d = \frac{N_N^d}{k_{Cu(II)-N}^d} \right]$$

to the tertiary amine groups of a Gx-NH$_2$ PAMAM dendrimer. The $K_{Cu(II)-N}^d$ values for the G4-NH$_2$ and G5-NH$_2$ EDA core PAMAM dendrimers are respectively equal to 3.15 and 3.78. As shown in Table 7, the binding constants of Cu(II) to the tertiary amine groups of the Gx-NH$_2$ PAMAM dendrimers (Diallo, M. S. et al., (2004) *Langmuir*, 20:2640-2651.) are comparable in magnitude to the formation constants of Cu(II)-ammonia complexes (Martell, A. E. et al., (1996), *Metal Complexes in Aqueous Solutions*; Plenum Press: New York.). Ammonia (NH$_3$) is representative of metal ion chelating agents with saturated N donors (Martell, A. E. et al., (1996), *Metal Complexes in Aqueous Solutions*; Plenum Press: New York.). Table III also suggests that the Gx-NH$_2$ PAMAM dendrimers will selectively bind Cu(II) over first-row transition metal ions such as Co(II) and Ni(II) and alkaline earth metal ions in wastewater such as Na(I), Ca(II) and Mg(II).

The dendrimer-enhanced filtration process (FIG. 1) is structured around two unit operations: 1. a clean water recovery unit and 2. a dendrimer recovery unit. In the clean water recovery unit, contaminated water is mixed with a solution of functionalized dendritic polymers (e.g., dendrimers, dendrigfrat polymers, hyperbranched polymers, core-shell tecto (dendrimers), etc) to carry out the specific reactions of interest (metal ion chelation in this case).

Following completion of the reaction, the resulting solution is filtered to recover the clean water. The contaminant laden dendrimer solutions are subsequently sent to a second filtration unit to recover and recycle the functionalized dendritic polymers (FIG. 1). As a proof-of-concept study of this novel water treatment process, the inventor carried out dead-end utrafiltration (UF) experiments to assess the feasibility of using DEUF to recover Cu(II) from aqueous solutions. To gain insight into membrane fouling, he used atomic force microscopy (AFM) to characterize dendrimer sorption onto model UF membranes. The overall results of these experiments suggest that DEUF is a useful process for recovering Cu(II) from aqueous solutions.

The evaluation of the commercially available EDA core Gx-NH$_2$ PAMAM dendrimers (FIG. 4) was focused upon. G3-NH$_2$, G4-NH$_2$ and G5-NH$_2$ EDA core PAMAM dendrimers were purchased from Sigma-Aldrich and used as received. Selected physicochemical properties of the PAMAM dendrimers are given in Table 5. Cu(II) was selected as the model metal ion for this study. Reagent grade Cu(NO$_3$)$_2$ from Sigma-Aldrich was used as source of Cu(II). UF experiments were carried out to measure the retention of dendrimers and Cu(II)-dendrimer complexes by model UF membranes. The experiments were performed in a 10-mL stirred cell (Amicon, Model 8010) with an effective membrane area of 4.1 cm$^2$. A 1-gallon stainless steel dispensing pressure vessel (Millipore) was connected to the stirred cell using PVC tubing. The reservoir was also equipped with a pressure gauge and relief valve. Pressure from nitrogen gas was applied to the stirred cell via the reservoir at 450 kPa (65 psi). For each run, the initial volume was 1 L. During each UF experiment, the stirred cell was operated for 4.5 hours with permeate collected every 30 minutes and flux measurements taken every 10 minutes Ultracel Amicon YM regenerated cellulose (RC) and PB Biomax polyethersulfone (PES) membranes from Millipore were evaluated in this study. The RC and PES membranes had a diameter of 25 mm with molecular weight cut-off (MWCO) of 5000 Dalton (5 kD) and 10000 Dalton (10 kD). For the UF measurements of dendrimer retention in aqueous solutions, the concentrations of the G3-NH$_2$ (2.42265 10$^{-5}$ mole/L), G4-NH$_2$ (8.49762 10$^{-6}$ mole/L) and G5-NH$_2$ (5.31808 10$^{-6}$ mole/L) PAMAM dendrimers were kept constant in all experiments.

Dendrimer concentrations in the feed and permeate solutions were measured using a Shimadzu Model 1601 UV-Visible spectrophotometer at wavelength of 201 nm. A detailed description of analytical techniques (including HPLC with UV-Visible detection) used to characterize the composition and purity of EDA core PAMAM dendrimers is given in Diallo, M. S. et al., (2004) *Langmuir*, 20:2640-2651. For the UF measurements of the retention of metal ion-dendrimer complexes, a Cu(II) concentration of 10 mg/L (0.00016 mole/L) was used in all experiments.

The molar ratio of Cu(II) to dendrimer NH$_2$ groups was also kept constant at 0.2 in all experiments. The Cu(II)-dendrimer solutions were maintained under constant agitation for 1 hour in the dispensing pressure vessel following adjustment of their pH with concentrated HCl or NaOH. The pH of aqueous solutions of PAMAM dendrimers and their complexes with Cu(II) can be controlled within 0.1-0.2 pH unit by addition of concentrated NaOH or HCl. The concentrations of metal ion in the feed and permeate were determined by atomic absorption spectrophotometry (Diallo, M. S. et al., (1999) *Environ. Sci. and Technol.* 33:820-824.-Diallo, M. S. et al., (2004) *Langmuir*, 20:2640-2651.). Solute retention (R) was expressed as:

$$R = \left(1 - \frac{C_p}{C_f}\right) \times 100 \quad (1)$$

where $C_p$ and $C_f$ are, respectively, the concentration of solute [i.e., dendrimer and Cu(II)] in the permeate and feed. The permeate flux $J_p$ (L h$^{-1}$ m$^{-2}$) and normalized permeate flux ($J_{pn}$) were expressed as:

$$J_p = \frac{Q_p}{A_{UF}} \quad (2)$$

$$J_{pn} = \frac{J_p}{J_{po}} \quad (3)$$

where $Q_p$ is the permeate flow rate (L h$^{-1}$) and $A_{UF}$ (m$^2$) is the effective area of the UF membrane and $J_{po}$ (L h$^{-1}$ m$^{-2}$) is the initial permeate flux through the clean membranes.

Atomic force microscopy (AFM) was employed to characterize the interactions of selected EDA core Gx-NH$_2$ PAMAM dendrimers and UF membranes evaluated in this study. Each UF membrane was mounted on a perforated aluminum sheet and stored overnight in a desiccators following exposure to a dendrimer aqueous solution as previously described. Tapping mode AFM experiments were carried out using a Model Dimension 3100 AFM from Digital Instruments. All AFM images were acquired at room temperature using etched silicon probes with a spring constant of 20-100 N/m and a tip radius of 5-10 nm. The topographic and phase images of the clean and exposed UF membranes were acquired simultaneously using a probe resonance frequency of ~300 kHz, a scan rate of 1 Hz, a free-oscillation amplitude (A$_o$) of 60 nm±5 nm and a set point to free amplitude ratio (rsp) of 0.50-0.75.

Figure 7:
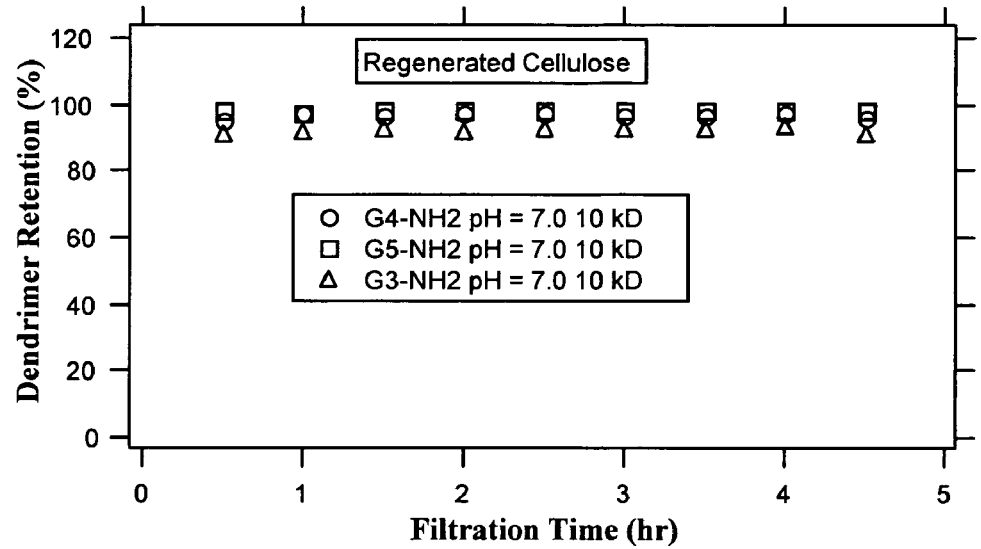
FIG. 7A shows the retention of EDA core G3-$NH_2$, G4-$NH_2$, and G5-$NH_2$ PAMAM dendrimers in aqueous solutions as a function of solution pH using a regenerated cellulose membrane in accordance with an embodiment of the present invention.
FIG. 7B shows the retention of EDA core G3-$NH_2$, G4-$NH_2$, and G5-$NH_2$ PAMAM dendrimers in aqueous solutions as a function of solution pH using a polyethersulfone membrane in accordance with an embodiment of the present invention.
Figure 7:
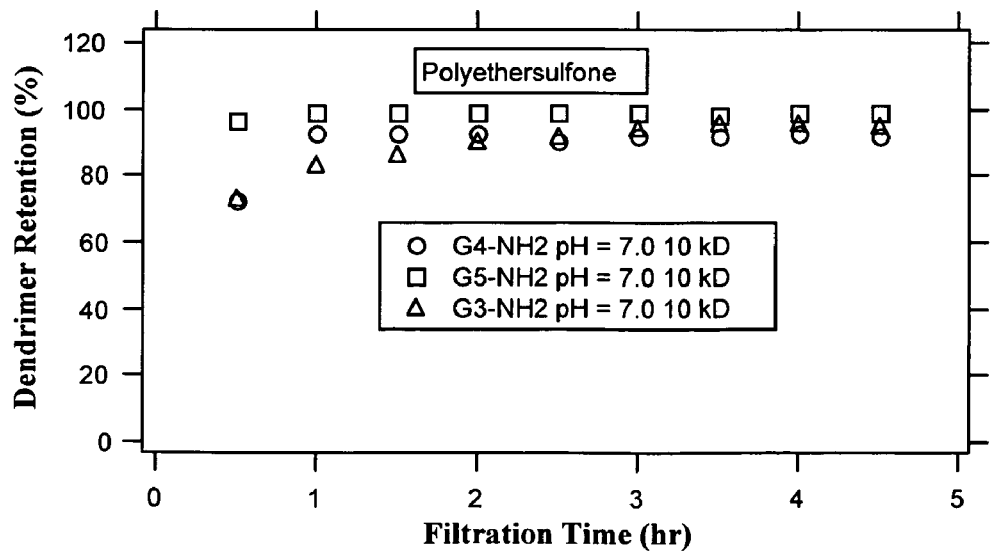

FIG. 7 highlights the effects of dendrimer generation and membrane chemistry on the retention of EDA core Gx-NH$_2$ PAMAM dendrimers in aqueous solutions at pH 7.0 and room temperature. The retentions of the G5-NH$_2$ PAMAM dendrimer by the 10 kD regenerated cellulose (RC) and polyethersulfone (PES) membrane are ≧97% in all cases. Such high retention values are expected for the G5-NH$_2$ EDA core PAMAM dendrimer, a globular macromolecule with a low polydispersity and a molar mass of 28826 Dalton (Table 5). Retentions greater than 90% were also observed for the G4-NH$_2$ PAMAM dendrimer (FIG. 7). This dendrimer is also globular in shape and has very low polydispersity with a molar mass (14215 Dalton) greater than the MWCO of the 10 kD RC and PES membranes (Table 5). Possible explanations for the initial low retention (≈73%) of this dendrimer by the 10 kD PES membrane include measurement errors and/or the presence of impurities such as unreacted EDA and other lower molar mass reaction by-products in the G4-NH$_2$ PAMAM dendrimer sample (Diallo, M. S. et al., (2004) *Langmuir,* 20:2640-2651.).

FIG. 7 also shows that the retentions of the G3-NH$_2$ EDA core PAMAM dendrimer are lower than those of the higher generation dendrimers. This dendrimer has the lowest molar mass (Table 5). For both membranes, there is a significant retention of the G3-NH$_2$ dendrimer even though the MWCO of the dendrimers are 45% larger than the dendrimer molar mass (6906 Dalton). In fact, the retention of the G3-NH$_2$ dendrimer by the 10 kD RC membrane (FIG. 7) is comparable to that of a linear polyethyleneimine (PEI) polymer with an average molar mass of 50 to 60 kD (4). For UF membranes, the MWCO is usually defined as the molar mass of a globular protein with 90% retention.

Because dendritic polymers can be described as hybrids between polymer chains and colloidal particles (Harreis, H. M. et al., (2003) *J. Chem. Phys.* 118:1979-1988. Rathgeber, S. et al., (2002) *J. Chem. Phys.* 117:4047-4062.), the use of the MWCO as indicator of dendrimer retention by UF membranes might not be adequate. Table 5 gives the radius of gyration (R$_G$) and hydrodynamic radius (R$_H$) of each EDA core Gx-NH$_2$ PAMAM dendrimer evaluated in this study. R$_G$ provides a measure of the size of a particle/macromolecule regardless of its shape (Richards, E. G., (1980) *An Introduction to Physical Properties of Large Molecules in Solution*; IUPAB Biophysics Series, New York.-Maiti, P. K., (2004) *Macromolecules,* 32:6236-6254.). Conversely, R$_H$ gives the size of an "equivalent" spherical particle/macromolecule (Armstrong, J. K. et al., (2004) *Biophys. J* 87:4259-4270.). The R$_G$ and R$_H$ of the PAMAM dendrimers were, respectively, estimated from small angle neutron scattering experiments (Dvomic, P. R. et al., (2001) *Dendrimers and other Dendritic Polymers*; Fréchet, J. M. J., Tomalia, D. A., Eds.; Wiley and Sons: New York.) and dilution solution viscosity measurements (Dvomic, P. R. et al., (2001) *Dendrimers and other Dendritic Polymers*; Fréchet, J. M. J., Tomalia, D. A., Eds.; Wiley and Sons: New York.). They are comparable in magnitude to the mean pore surface diameters (1.93-3.14 nm) of a series of UF membranes (1-10 kD MWCO) that was recently characterized by Bowen and Doneva (Bowen, R. W., (2000) *Surf. Interf. Analysis.* 29:544-547.). Whereas the molar mass of each Gx-NH$_2$ PAMAM dendrimer increases by a factor of 2 at each generation, Table 5 shows that the corresponding radii of gyration and hydrodynamic radii increase linearly with dendrimer generation. Table 5 also shows no significant differences between the R$_G$ and R$_H$ of each Gx-NH$_2$ PAMAM dendrimer. While not wishing to be bound by any particular theory, the inventor believes that the slightly higher R$_H$ values could be attributed for the most part to dendrimer hydration. Because the differences in the retentions of the EDA core Gx-NH$_2$ PAMAM dendrimers are (for the most part) comparable to the differences between their radii of gyration and hydrodynamic diameter, the R$_G$/R$_H$ appears to be a better indicator of dendrimer retention by UF membranes in aqueous solutions.

The overall results of the measurements of dendrimer retention by the 10 kD RC and PES membranes at pH 7.0 suggest that dendrimers such as the Gx-NH$_2$ EDA core PAMAM have much less tendency to pass through the pores of UF membranes than linear polymers of similar molar mass because of their much smaller polydispersity and persistent globular shapes in aqueous solutions over a broad range of solution pH and background electrolyte concentration (Newkome, G. R. et al., (1996) *Dendritic Molecules. Concepts-Syntheses-Perspectives*; VCH: New York.; Fréchet, J. M. J. et al., (2001) *Dendrimers and other Dendritic Polymers*; Wiley and Sons: New York.; and Bosman, A. W. et al., (1999) *Chem. Rev.* 99:1665-1668.).

Figure 8:
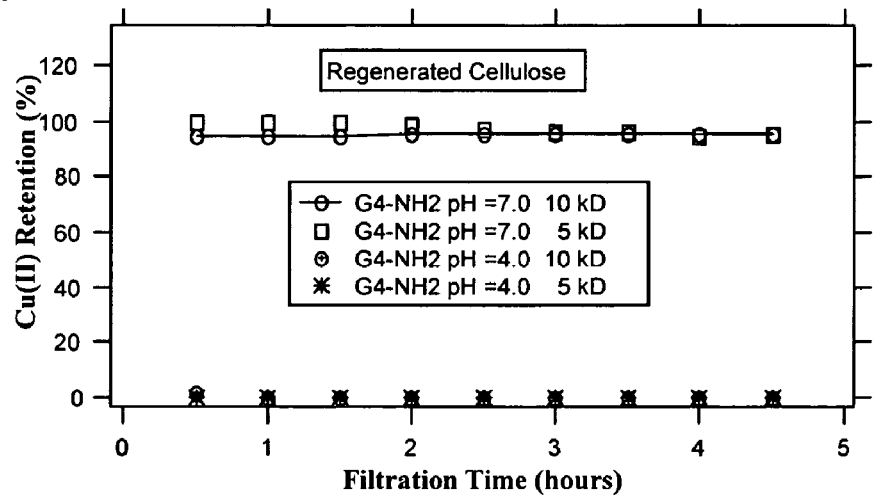
FIG. 8A shows Cu(II) retention in aqueous solutions of EDA core G4-$NH_2$ PAMAM dendrimers as a function of solution pH and molecular weight cut-off using a regenerated cellulose membrane in accordance with an embodiment of the present invention.
FIG. 8B shows Cu(II) retention in aqueous solutions of EDA core G4-$NH_2$ PAMAM dendrimers as a function of solution pH and molecular weight cut-off using a polyethersulfone membrane in accordance with an embodiment of the present invention.
FIG. 8C shows Cu(II) retention in aqueous solutions of EDA core G3-$NH_2$, G4-$NH_2$, and G5-$NH_2$ PAMAM dendrimers as a function of demdrimer type and membrane chemistry in accordance with an embodiment of the present invention.
Figure 8:
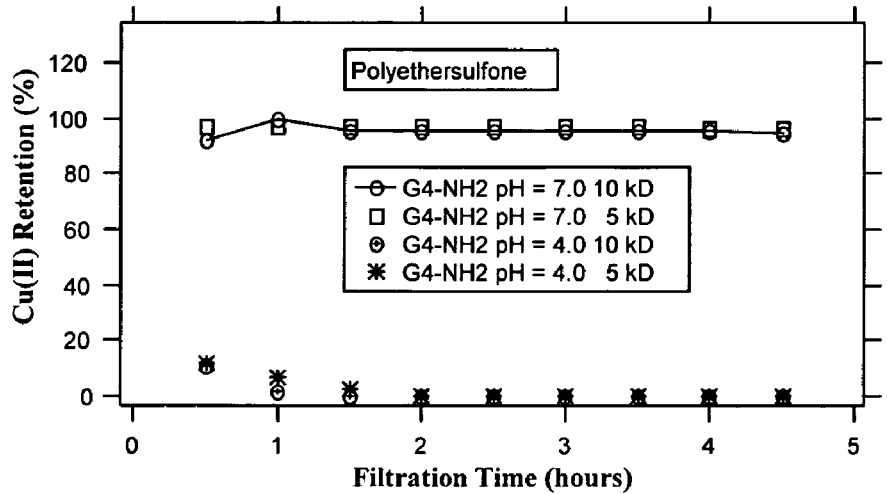
Figure 8:
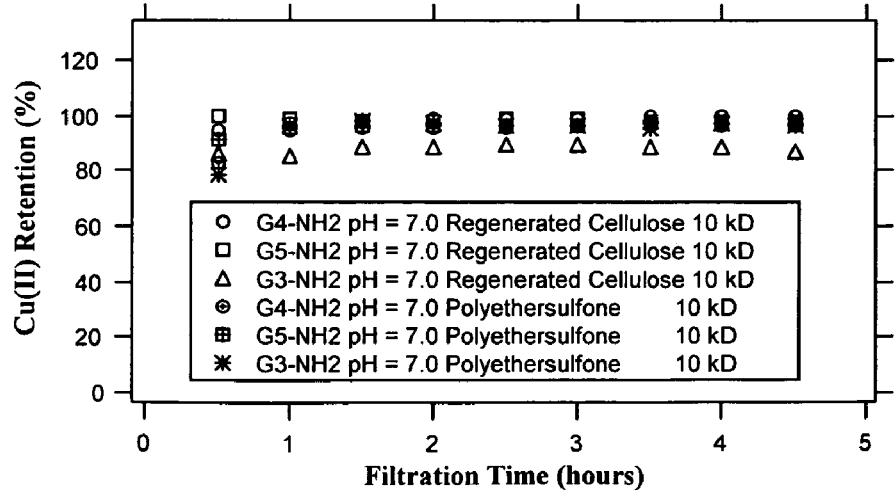

FIG. 8 highlights the effects of solution pH, membrane chemistry and MWCO on the retention of aqueous complexes of Cu(II) with a G4-NH$_2$ EDA core PAMAM dendrimer at room temperature. A Cu(II) concentration of 10 mg/L (0.00016 mole/L) was used in all experiments. The molar ratio of Cu(II) to dendrimer NH$_2$ groups was also kept constant at 0.2 to ensure that all the Cu(II) ions will be bound to the tertiary amine groups of the Gx-NH$_2$ PAMAM dendrimers at pH 7.0 (Diallo, M. S. et al., (2004) *Langmuir,* 20:2640-2651.).

As shown in FIG. 8, 95 to 100% of the complexes of Cu(II) with the G4-NH$_2$ PAMAM dendrimer are retained by the RC membranes at pH 7.0. The PES membranes also retain 92 to 100% of the Cu(II)-dendrimer complexes at pH 7.0. These results are consistent with the measurements of dendrimer retention (FIG. 7) and metal ion binding measurements which show that 100% of the Cu(II) ions are bound to the G4-NH$_2$ PAMAM dendrimer at pH 7.0 and Cu(II) dendrimer terminal NH$_2$ groups molar ratio of 0.2. Consistent with the results of the metal ion binding measurements and dendrimer extent of protonation (Diallo, M. S. et al., (2004) *Langmuir,* 20:2640-2651.), no retention of Cu(II)-dendrimer complexes by the RC membranes occurs at pH 4.0 (FIG. 8). However, a small retention of Cu(II) (~10%) is initially observed for both PES membranes at pH 4.0. Possible explanations for this result include measurement errors and/or metal ion sorption onto the PES membranes.

FIG. 8 illustrates the effects of dendrimer generation on the retention of Cu(II)-dendrimer complexes by the 10 kD membranes at pH 7.0. Here again, the observed retention values are consistent with the results of the dendrimer retention measurements (FIG. 7). Higher retention values are observed for the complexes of Cu(II) with the G5-NH2 PAMAM dendrimer. Conversely, smaller retention values for the Cu(II)-dendrimer complexes are observed with the G3-NH2 PAMAM dendrimer (FIG. 8). For both membranes, FIG. 8 shows significant retentions of Cu(II) complexes with the G3-NH2 dendrimer (86-89% for the 10 kD RC membrane and 80-97% for the 10 kD PES membrane) even though the MWCO of each membrane is 45% larger than the dendrimer molar mass. These results also suggest that the MWCO of a UF membrane might not be an adequate indicator of the retention of Cu(II)+dendrimer complexes by UF membranes in aqueous solutions.

Figure 9:
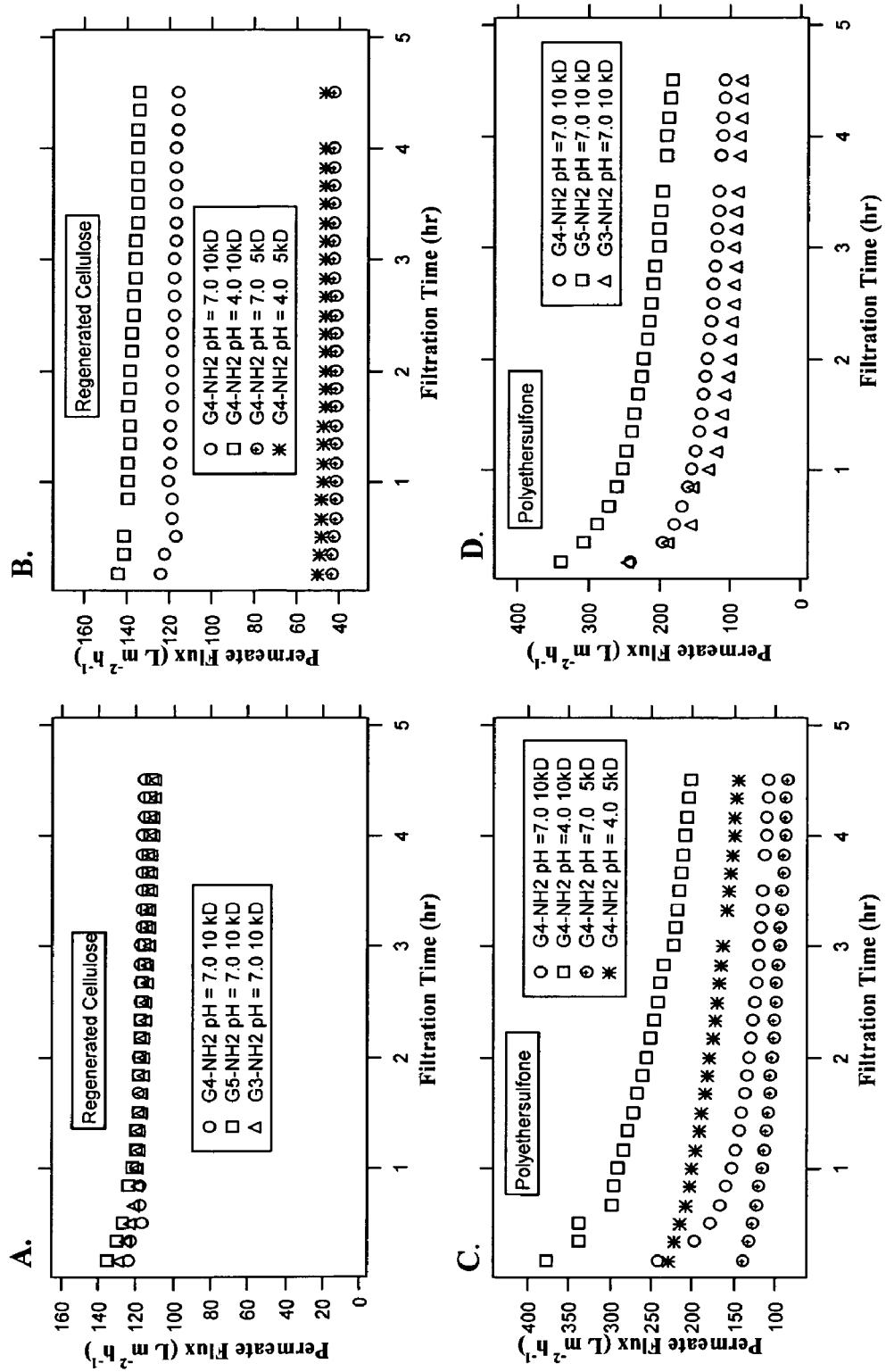
FIG. 9A shows the permeate flux in aqueous solutions of Cu(II)+EDA Core G4-$NH_2$ PAMAM at pH 7, with a 10 kD cut-off regenerated cellulose membrane in accordance with an embodiment of the present invention.
FIG. 9B shows the permeate flux in aqueous solutions of Cu(II)+EDA Core G4-$NH_2$ PAMAM dendrimer as a function of solution pH and molecular weight cut-off with a regenerated cellulose membrane in accordance with an embodiment of the present invention.
FIG. 9C shows the permeate flux in aqueous solutions of Cu(II)+EDA Core G4-$NH_2$ PAMAM dendrimer as a function of solution pH and molecular weight cut-off with a polyethersulfone membrane in accordance with an embodiment of the present invention.
FIG. 9D shows the permeate flux in aqueous solutions of Cu(II)+EDA Core G3-$NH_2$, G4-$NH_2$, and G5-$NH_2$ PAMAM dendrimers at pH 7 with a polyethersulfone membrane, in accordance with an embodiment of the present invention.
Figure 10:
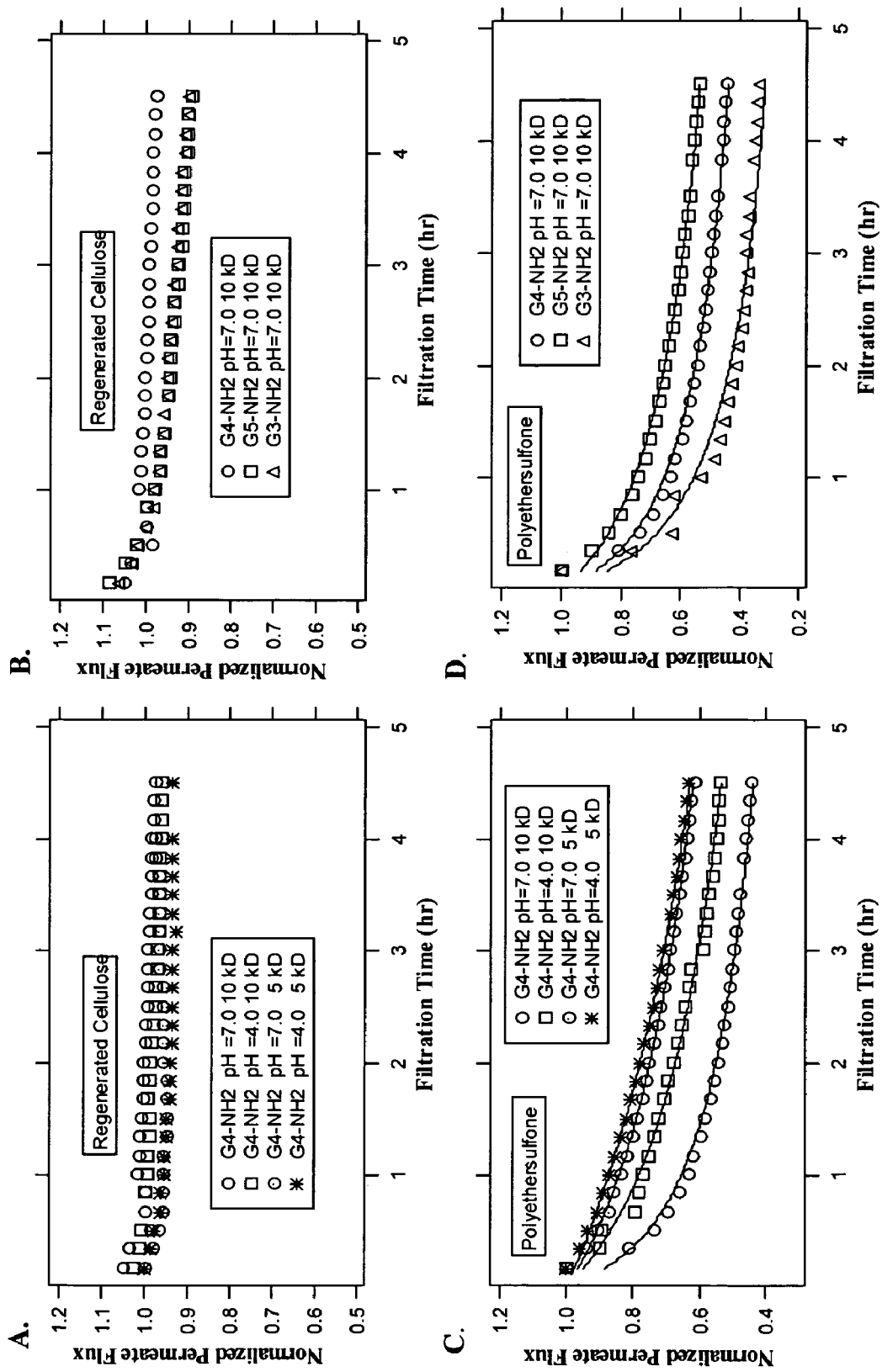
FIG. 10A shows normalized permeate flux in aqueous solutions of Cu(II)+EDA core G4-$NH_2$ PAMAM dendrimer as a function of solution pH and molecular weight cut-off with a regenerated cellulose membrane in accordance with an embodiment of the present invention.
FIG. 10B shows normalized permeate flux in aqueous solutions of Cu(II)+EDA core G3-$NH_2$, G4-$NH_2$, and G5-$NH_2$ PAMAM dendrimers at pH 7 with a 10 kD molecular weight cut-off regenerated cellulose membrane in accordance with an embodiment of the present invention.
FIG. 10C shows normalized permeate flux in aqueous solutions of Cu(II)+EDA core G4-$NH_2$ PAMAM dendrimers as a function of solution pH and molecular weight cut-off with a polyethersulfone membrane in accordance with an embodiment of the present invention.
FIG. 10D shows normalized permeate flux in aqueous solutions of Cu(II)+EDA core G3-$NH_2$, G4-$NH_2$, and G5-$NH_2$ PAMAM dendrimers at pH 7 with a 10 kD molecular weight cut-off polyethersulfone membrane in accordance with an embodiment of the present invention.

Fouling is a major limiting factor to the use of membrane based processes in environmental and industrial separations (Zeman, L. J. et al., (1996) *Microfiltration and Ultrafiltration. Principles and Applications*; Marcel Dekker: New York. and Kilduff, J. E. et al., (2002) *Env. Eng. Sci.* 19:477-495.). A characteristic signature of membrane fouling is a reduction in permeate flux through a membrane during filtration. The permeate fluxes of aqueous solutions of Cu(II) complexes with Gx-NH$_2$ PAMAM dendrimers through RC and PES membranes at pH 7.0 and 4.0 were measured. In these experiments, the Cu(II) concentration (10 mg/L) and molar ratio of Cu(II) to dendrimer NH$_2$ groups (0.2) were also kept constant. FIG. 9 shows the permeate fluxes through the RC and PES membranes. For the 10 kD RC membrane at pH 7.0, the permeate flux shows little change over the course of the filtration varying from 124.0 to 116.0 L m$^{-2}$h$^{-1}$. A similar behavior is also observed at pH 4.0. However, in this case, the permeate fluxes are approximately 16% higher. The permeate fluxes through the 5 kD RC membranes also exhibit little variation (49.0-43.0 L m$^{-2}$h$^{-1}$) during the course of the filtration at pH 7.0 and 4.0 (FIG. 9). FIG. 9 also shows that dendrimer generation does not significantly affect the permeate flux through the 10 kD RC membrane. This sharply contrasts the significant decline of permeate flux observed for the 5 kD and 10 kD PES membranes (FIG. 9). Although the initial permeate fluxes are much larger for the PES membranes, significant flux declines (45 to 63%) occur during the filtration of aqueous solutions of Cu(II) complexes with the G4-NH$_2$ PAMAM dendrimer at pH 7.0 and 4.0 (FIG. 9). In this case, we also observe a significant impact of dendrimer generation on the permeate flux of aqueous solutions of Cu(II)-dendrimer complexes through the 10 kD PES membranes at pH 7.0. FIG. 10 shows a decline in the normalized permeate fluxes for both the RC and PES membranes during the filtration of aqueous solutions of Cu(II) complexes with Gx-NH$_2$ PAMAM dendrimer at pH 7.0. For the 5 kD and 10 kD RC membranes, a small decline in the relative permeate flux (7 to 18%) is observed. However, the decrease in relative permeate flux (46 to 81%) is much larger for the PES membranes. At pH 4.0, a significant decrease in permeate flux (13 to 68%) is observed for the PES membranes. These results suggest that the PES membranes are more susceptible to fouling by the aqueous solutions of Gx-NH$_2$ PAMAM dendrimer+Cu(II) than the corresponding RC membranes.

The mechanisms of fouling of UF membranes are not well understood. For organic macromolecules such as proteins, linear polymers and humic acids, membrane fouling may be caused by (i) concentration polarization resulting from solute accumulation near a membrane surface, (ii) pore blockage by solute sorption onto the surface of a membrane or within its pores and (iii) the formation of a cake layer by sorption/deposition of solutes on a membrane surface (Zeman, L. J. et al., (1996) *Microfiltration and Ultrafiltration. Principles and Applications*; Marcel Dekker: New York. and Kilduff, J. E. et al., (2002) *Env. Eng. Sci.* 19:477-495.). To learn more about the fouling of the RC and PS membranes by EDA core Gx-NH$_2$ PAMAM dendrimers, the inventor used the data analysis software IGOR Pro Version 4.0 from WaveMetrics, Inc (IGOR Pro Version 4.0. WaveMetrics) to fit the normalized permeate fluxes to two phenomenological models of membrane fouling (FIG. 7). The first model is a pore blockage model that expresses the decline in the normalized permeate flux as an exponential decay function (Zeman, L. J. et al., (1996) *Microfiltration and Ultrafiltration. Principles and Applications*; Marcel Dekker: New York. and Kilduff, J. E. et al., (2002) *Env. Eng. Sci.* 19:477-495.). This model did not provide a good fit of the data (results not shown). The second model expresses the decline in the normalized permeate flux as a power-law function (Zeman, L. J. et al., (1996) *Microfiltration and Ultrafiltration. Principles and Applications*; Marcel Dekker: New York. and Kilduff, J. E. et al., (2002) *Env. Eng. Sci.* 19:477-495.):

$$J_{pn} = (1+kt)^{-n} \qquad (4)$$

where k (h$^{-1}$) is a filtration rate constant and n is a dimensionless exponent. As shown in FIG. 10 and Table 8, this model provides a very good fit of the normalized permeate flux for the all the PES membranes. For the G4-NH$_2$ PAMAM dendrimer, the estimated values of n for the 10 kD PES membranes are 0.31±0.03 at pH 7.0 and 0.39±0.03 at pH 4.0 (Table 8). For the 5 kD PES membrane, the n values are equal to 0.36±0.02 at pH 7.0 and 0.63±0.05 at pH 4.0 (Table 8). The n values for the G3-NH$_2$ and G5-NH$_2$ PAMAM dendrimers membranes are, respectively, equal to 0.45±0.05 and 0.30±0.02 for the 10 kD PES membranes at pH 7.0. For dead-end ultrafiltration, Zeeman and Zydney (Zeman, L. J. et al., (1996) *Microfiltration and Ultrafiltration. Principles and Applications*; Marcel Dekker: New York.) and Kilduff et al. (Kilduff, J. E. et al., (2002) *Env. Eng. Sci.* 19:477-495.) have shown that the decline in permeate flux can be described by a pore constriction model when n ~2. This model assumes that the rate of change in the membrane pore volume is proportional to the rate of particle convection to the membrane surface. When n ~0.5, the decline in permeate flux in a dead-end ultrafiltration process can be described by a cake filtration model (Zeman, L. J. et al., (1996) *Microfiltration and Ultrafiltration. Principles and Applications*; Marcel Dekker: New York. and Kilduff, J. E. et al., (2002) *Env. Eng. Sci.* 19:477-495.). This model attributes the loss of permeate flux to particle deposition on the membrane surface. Based on the estimated n values given in Table 8, the sorption and deposition of dendrimer+Cu(II) complexes onto the membrane surfaces appears to be a plausible fouling mechanism for the PES membranes. We also believe that the small decline in the relative permeate fluxes (7 to 18%) through the 5K and 10 K RC membranes (FIG. 10) could also be attributed to the sorption of dendrimer-Cu(II) complexes onto the membrane surfaces.

TABLE 8

Fitted Model Parameters for the Normalized Permeate Flux of Aqueous Solutions of EDA Core Gx-NH$_2$ PAMAM Dendrimers + Cu(II) Through Polyethersulfone Membranes

| Dendrimer | Membrane MWCO | pH | $^a$k(h$^{-1}$) | $^a$n | $^b\chi^2$ |
|---|---|---|---|---|---|
| G4-NH$_2$ | 10 kD | 7.0 | 2.98 ± 0.58 | 0.31 ± 0.03 | 0.016 |
| G4-NH$_2$ | 10 kD | 4.0 | 0.86 ± 0.13 | 0.39 ± 0.03 | 0.007 |
| G4-NH$_2$ | 5 kD | 7.0 | 0.62 ± 0.06 | 0.36 ± 0.02 | 0.001 |
| G4-NH$_2$ | 5 kD | 4.0 | 0.24 ± 0.05 | 0.63 ± 0.05 | 0.001 |
| G5-NH$_2$ | 10 kD | 7.0 | 1.53 ± 0.21 | 0.30 ± 0.02 | 0.016 |
| G3-NH$_2$ | 10 kD | 7.0 | 2.74 ± 0.75 | 0.45 ± 0.05 | 0.037 |

$^a$k and n are determined by fitting the measured relative permeate fluxes to Equation 4.

$^b$Goodness of fit parameter. $\chi^2 = \sum_i \left(\frac{y - y_i}{\sigma_i}\right)$; where y is the fitted value, y$_i$ is the measured value and σ$_i$ is the estimated standard deviation for y$_i$ (IGOR Pro Version 4.0. WaveMetrics).

Figure 12:
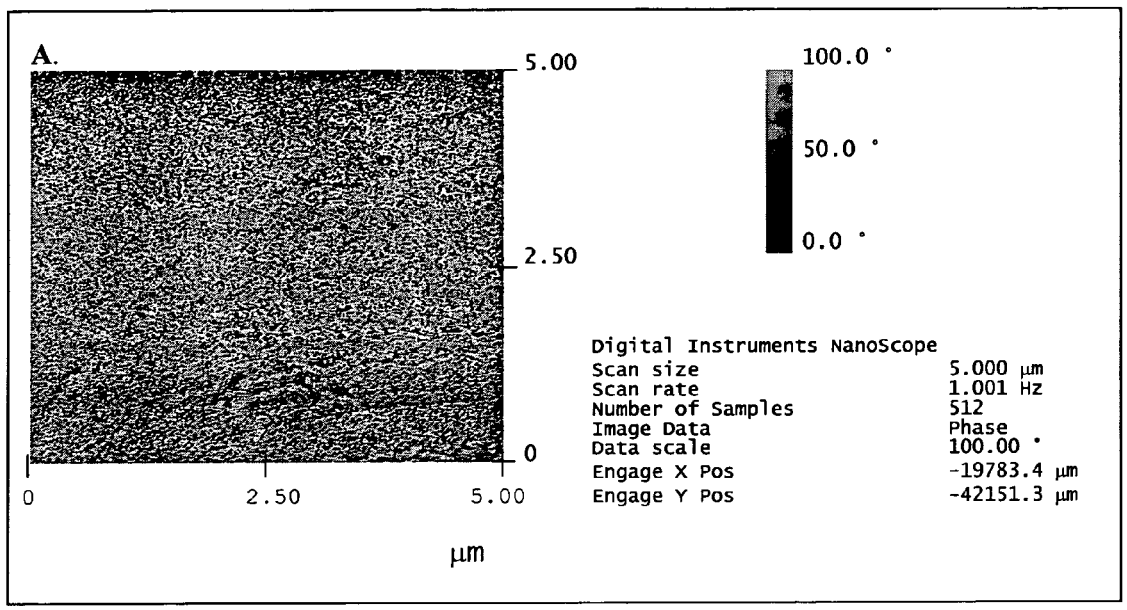
FIG. 12A shows an AFM Phase image of a clean 10 kD polyethersulfone membrane as received in accordance with an embodiment of the present invention. The scan area was 5 µm×5 µm.
FIG. 12B shows an AFM Phase image of a fouled 10 kD polyethersulfone membrane that was exposed to a 1.23 $10^{-5}$ mole/L aqueous solution of G4-$NH_2$ PAMAM dendrimer at pH 7.0 in accordance with an embodiment of the present invention. The scan area was 5 µm×5 µm.
Figure 12:
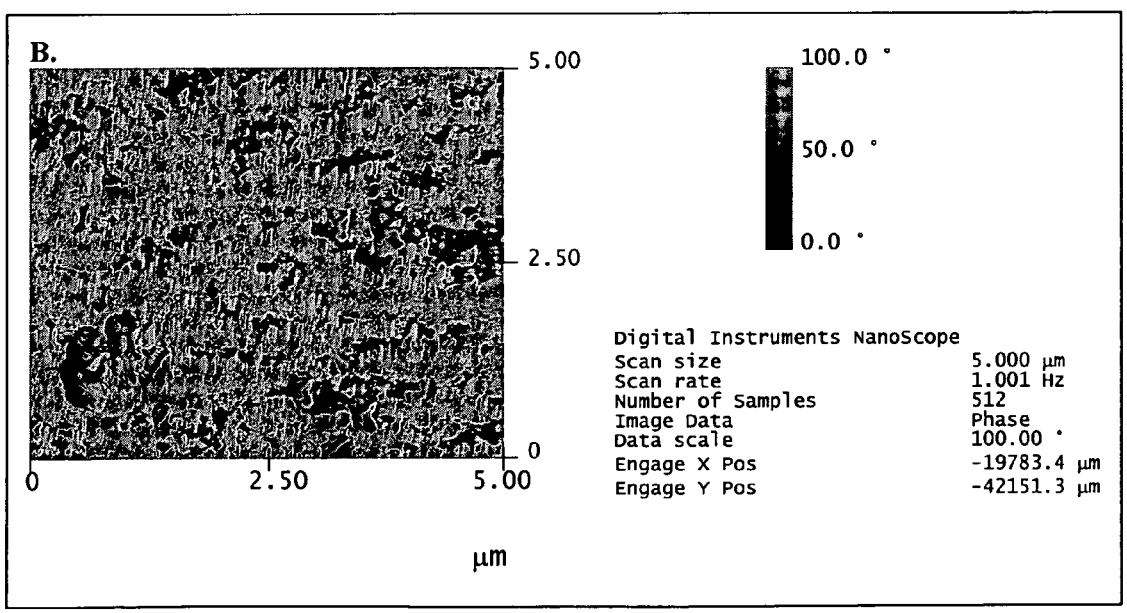
Figure 13:
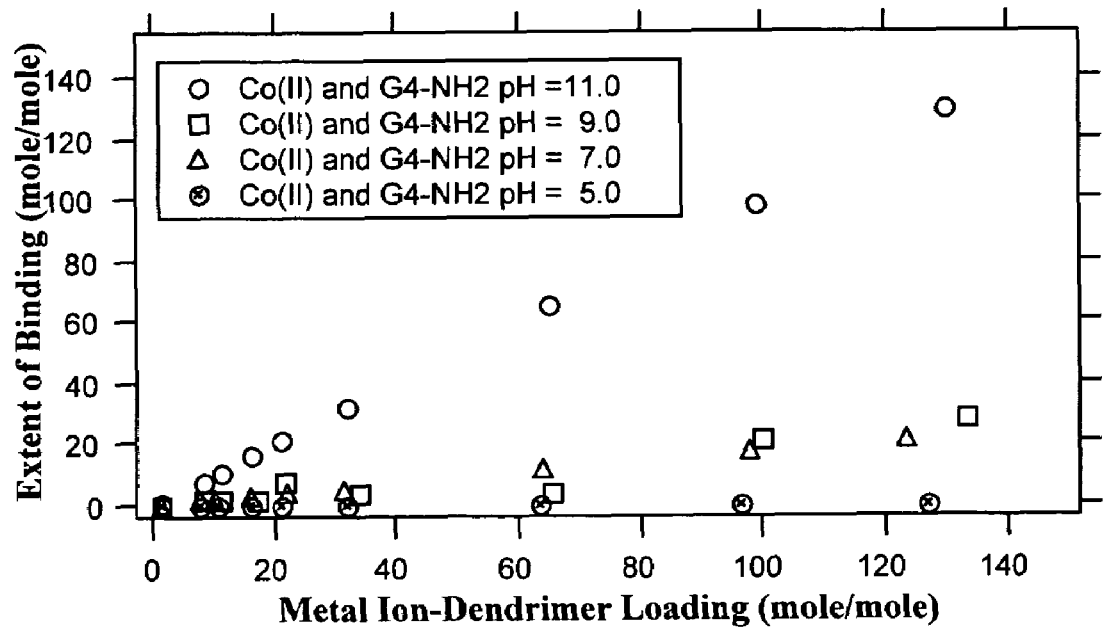
FIG. 13 shows the extent of binding of Co(II) in aqueous solutions of EDA core G4-$NH_2$ PAMAM dendrimer at room temperature as function of solution pH and metal ion dendrimer loading in accordance with an embodiment of the present invention.

To gain insight into the relationship between dendrimer sorption and membrane fouling, the inventor used AFM to characterize RC and PES membranes that have been exposed to a G4-NH$_2$ PAMAM dendrimer at pH 7.0 during the filtration experiments. AFM has emerged as a powerful tool for charactering filtration membranes (Bowen, R. W., (2000) *Surf Interf Analysis*. 29:544-547.-Zeman, L. J. et al., (1996) *Microfiltration and Ultrafiltration. Principles and Applications*; Marcel Dekker: New York.; Khulbe, K. C. et al., (2000) *Polymer*. 41:1917-1935.; Fritzsche, A. K., et al. (1992) *J. Appl. Polym. Sci*. 45:1945-1956.; Zeng, Y. et al., (2003) *J. Appl. Polym. Sci*. 88:1328-1335.; Madaeni, S. S., (2004) *J. Porous. Mat*. 11:255-263.; and Bowen, R. W. et al., (2002) *Surf. Interf. Analysis*. 33:7-13.). AFM has also successfully been used to characterize Gx-NH$_2$ PAMAM dendrimers adsorbed onto solid surfaces (Li, J. et al., (2000) *Langmuir*. 16:5613-5616.; Muller, T. M. et al., (2002) *Langmuir*. 18:7452-7455.; and Pericet-Camara, R. et al., (2004) *Langmuir*. 20:3264.). FIGS. 12 and 13 show AFM phase images of clean and fouled 10 kD RC and PES membranes. A scan area of 5 μm×5 μm was used in all the AFM experiments. The AFM images were subsequently analyzed (Nanoscope Command Reference Manual; Software version 5.12, Revision B: Digital Intruments/Veeco Metrology, 2001.) to determine the roughness parameter (RMS), the mean roughness ($R_a$) and the maximum height ($R_{max}$) along two different sections. The results of this analysis are given in Table 9 and Supporting Information.

TABLE 9

Section Analysis of AFM Images of Clean and Fouled Regenerated Cellulose (RC) and Polyethersulfone (PES) Ultrafiltration Membranes.

| Membrane | Status | [c]RMS nm | [d]$R_a$ nm | [e]$R_{max}$ nm |
|---|---|---|---|---|
| 10 kD RC | [a]Clean | 4.63-3.45 | 2.09-1.73 | 51.48-36.58 |
| 10 kD RC | [b]Fouled | 9.20-6.56 | 5.46-3.32 | 55.23-49.17 |
| 10 kD PES | [a]Clean | 14.96-13.07 | 11.76-9.28 | 51.75-47.56 |
| 10 kD PES | [b]Fouled | 14.07-14.22 | 9.90-10.25 | 61.66–65.86 |

[a]As received from Millipore.
[b]Exposed to a 1.23 10$^{-5}$ mole/L aqueous solution of G4-NH$_2$ PAMAM dendrimer in a 10-mL dead-end stirred cell (Amicon, Model 8010) during 4.5 hours.

[c]RMS is the standard deviation $\sigma = \sqrt{\dfrac{\sum_i (Z_i - Z_{ave})}{N}}$ (Nanoscope Command Reference Manual; Software version 5.12, Revision B: Digital Intruments/Veeco Metrology, 2001.); where $Z_i$ is the height at point i, $Z_{ave}$ is the average height and N is the number of points i between the reference markers.

Figure 11:
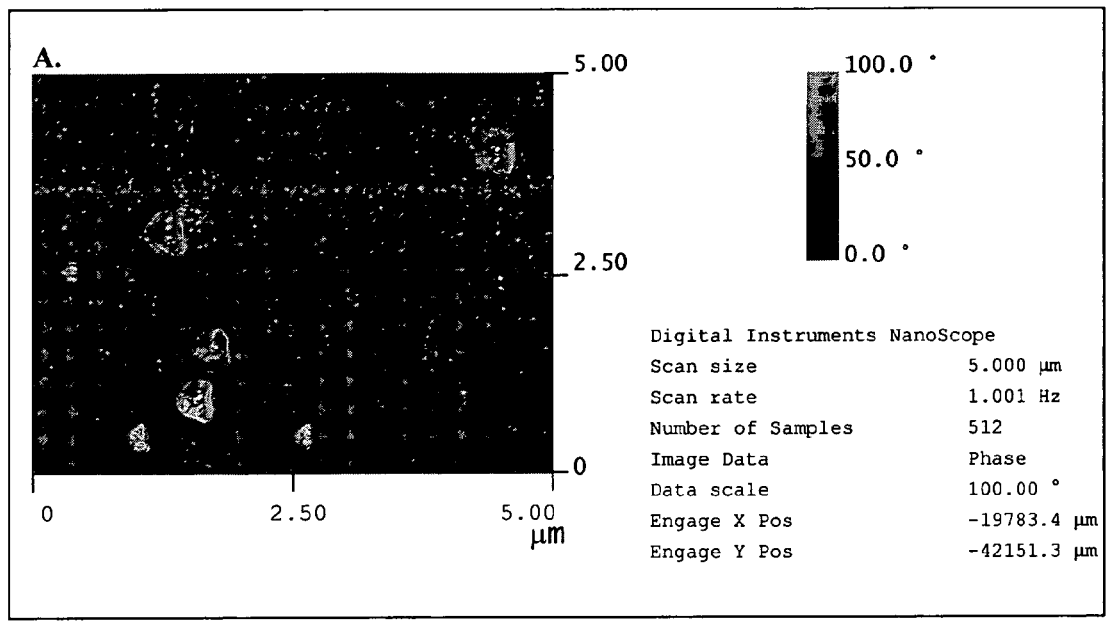
FIG. 11A shows an AFM phase emages of a clean regenerated cellulose membrane in accordance with an embodiment of the present invention. The scan area was 5 µm×5 µm. The image is of the 10 kD RC membrane as received.
FIG. 11B shows an AFM phase emages a fouled regenerated cellulose membrane in accordance with an embodiment of the present invention. The scan area was 5 µm×5 µm. The 10 kD RC membrane was exposed to a 1.23 $10^{-5}$ mole/L aqueous solution of G4-$NH_2$ PAMAM dendrimer at pH 7.0.
Figure 11:
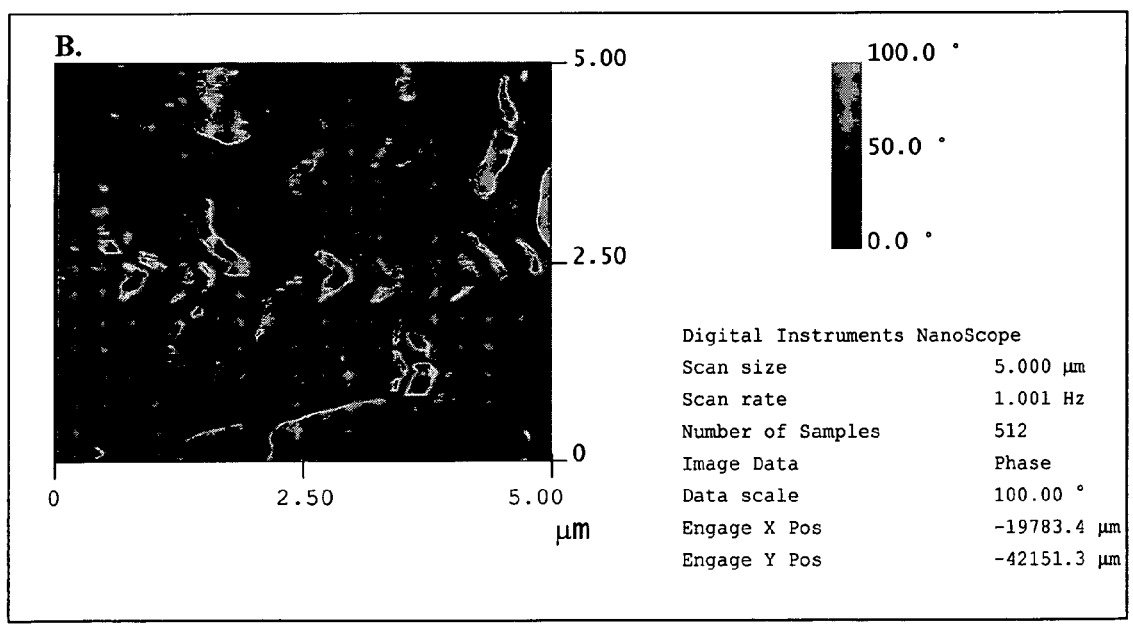

[d]$R_a$ is the "Mean Roughness". $R_a = \dfrac{1}{L}\int_0^L |f(x)|dx$ Nanoscope Command Reference Manual; Software version 5.12, Revision B: Digital Intruments/Veeco Metrology, 2001.); where L is the length of the roughness curve and f(x) is the roughness curve relative to the center line.
[e]$R_{max}$ is the "Maximum Height" (Nanoscope Command Reference Manual; Software version 5.12, Revision B: Digital Intruments/Veeco Metrology, 2001.). It is the difference in height between the highest and lowest points on the cross sectional profile relative to the center line Except for the presence of a few "rough" spots, the clean 10 kD RC membrane exhibits a smooth and uniform skin. Conversely, the PES membrane exhibits a dense, tightly, packed and grainy structure characteristics of membranes with nodular skin morphology (Zeman, L. J. et al., (1996) *Microfiltration and Ultrafiltration. Principles and Applications*; Marcel Dekker: New York.). The RMS and $R_a$ of the clean PES membrane are significant larger than those of the clean RC membrane (Table 9). As shown in FIG. 11, only a small fraction of the fouled RC membrane is covered by the sorbed G4-NH$_2$ PAMAM dendrimers. Most of the sorbed dendrimer molecules appear to cluster around the "rough" spots of the RC membrane surface (FIG. 11) thereby suggesting that dendrimer sorption in this case is a non-specific process primary driven by membrane surface roughness (Khulbe, K. C. et al., (2000) *Polymer*. 41:1917-1935. and Madaeni, S. S., (2004) *J. Porous. Mat*. 11:255-263.). This sharply contrasts the extensive coverage of the PES membrane surface by sorbed dendrimers (FIG. 12). While not wishing to be bound by any particular theory, the inventor believes that dendrimer sorption on the PES surface is mediated by electrostatic attractions between the protonated terminal NH$_2$ groups of the G4-NH$_2$ PAMAM dendrimer (FIG. 6) and the negatively charged PES membranes at pH 7.0. The overall results of the AFM experiments suggest that there is a significant correlation between the extent of dendrimer sorption and membrane fouling.

Polymer enhanced ultrafiltration (PEUF) has emerged as a promising process for recovering metal ions from aqueous solutions. The efficiency of PEUF based processes for treatment of water contaminated by metal ions will depend on several factors including: (i) polymer binding capacity and selectivity toward the targeted metal ions, (ii) polymer molar mass and responsiveness to stimuli such as solution pH, (iii) polymer sorption tendency onto UF membranes and (iv) polymer stability and toxicity. An ideal polymer for PEUF treatment of water contaminated by metal ions should be highly soluble in water and have a high binding capacity/selectivity toward the targeted metal ions along with a low sorption tendency toward UF membranes. Its molar mass should be high enough to ensure complete retention of the metal ion-polymer complexes by UF membranes without significant polymer leakage and decrease in permeate flux. The metal ion binding capacity of an ideal polymer for PEUF should also exhibit sensitivity to stimuli such as solution pH over a range broad enough to allow efficient recovery and recycling of the polymer by a simple change of solution pH. An ideal polymer for PEUF should also be nontoxic and stable with a long life cycle to minimize polymer consumption.

On a mass basis, the Cu(II) binding capacities of the Gx-NH$_2$ PAMAM dendrimers are much larger and more sensitive to solution pH (Table 6) than those of linear polymers with amine groups that have been used in previous PEUF studies (Geckeler, (1996) *Envir. Sci. Technol* 30, 725-734.). Table 7 shows that Na(I), Ca(II) and Mg(II) have very low binding affinity toward ligands with N donors such as NH$_3$. Thus, the high concentrations of Na(I), Ca(II) and Mg(II) found in most industrial wastewater streams are not expected to have a significant effect on the Cu(II) binding capacity and selectivity of EDA core Gx-NH$_2$ PAMAM dendrimers.

TABLE 6

Cu(II) Binding Capacity (mg/g) of Gx-NH$_2$ EDA Core PAMAM Dendrimers and Linear Polymers with Amine Groups in Aqueous Solutions

| Chelating Ligand | Binding Capacity pH = 9.0 | Binding Capacity pH = 6-8.0 | Binding Capacity pH = 2.0-5.0 |
|---|---|---|---|
| [a]G3-NH$_2$ PAMAM | 420.0 | 333.0 (pH = 7.0) | 0 |
| [a]G4-NH$_2$ PAMAM | 451.0 | 329.0 ± 8.0 (pH = 7.0) | 0 |
| [a]G5-NH$_2$ PAMAM | 395.31 | 308.0 ± 20.0 (pH = 7.0) | 0 |
| [b]Poly(ethyleneimine) | NA | 153.0 (pH = 6.0) | 55 (pH = 2.4)-189 (pH = 4.0) |
| [b]Poly(ethylene) pyridine 2-aldimine) | NA | 120.0 (pH = 6.0) | NA |

TABLE 6-continued

Cu(II) Binding Capacity (mg/g) of Gx-NH$_2$ EDA Core PAMAM Dendrimers and Linear Polymers with Amine Groups in Aqueous Solutions

| Chelating Ligand | Binding Capacity pH = 9.0 | Binding Capacity pH = 6-8.0 | Binding Capacity pH = 2.0-5.0 |
|---|---|---|---|
| [b]Poly(ethylene aminodiacetic acid) | NA | 120.0 (pH = 6.0) | NA |

[a]The Cu(II) binding capacity (mg/g) of the Gx-NH$_2$ EDA core PAMAM dendrimers were estimated from their measured Cu(II) extents of binding (Diallo, M. S. et al., (2004) Langmuir, 20: 2640-2651.).
[b]The Cu(II) binding capacity of the linear polymers with amine groups were taken from Geckeler and Volchek (Geckeler, (1996)Envir. Sci. Technol 30, 725-734.).

TABLE 7

Formation Constants of Selected Metal Ion-Ammonia Complexes and Estimated Binding Constants of Cu(II) to the Tertiary Amines Groups of EDA Core Gx-NH2 PAMAM Dendrimers

| Metal Ion | [a]log K$_1$ (NH$_3$) | [b]log K$_{Cu(II)-N}$[d] (G4-NH$_2$) | [c]log K$_{Cu(II)-N}$[d] (G4-NH$_2$) |
|---|---|---|---|
| Cu(II) | 4.04 | 3.15 | 3.78 |
| Co(II) | 2.10 | [d]NA | [d]NA |
| Ni(II) | 2.70 | [d]NA | [d]NA |
| Na(I) | −1.1 | [d]NA | [d]NA |
| Mg(II) | 0.23 | [d]NA | [d]NA |
| Ca(II) | −0.2 | [d]NA | [d]NA |

[a]Data are taken from Martell and Hancock (Martell, A. E. et al., (1996), Metal Complexes in Aqueous Solutions; Plenum Press: New York.).
[b]Estimated using the two-site thermodynamic model of Cu(II) binding to Gx-NH$_2$ PAMAM dendrimers at neutral pH developed by Diallo et al. (Diallo, M. S. et al., (2004) Langmuir, 20: 2640-2651.).

As shown in FIG. 8, separation of the dendrimer-Cu(II) complexes from solutions can simply be achieved by ultrafiltration. The metal ion laden-dendrimers can also be regenerated by decreasing the solution pH to 4.0 (FIG. 8). Dendritic macromolecules such the Gx-NH$_2$ EDA core PAMAM dendrimers have also much less tendency to pass through the pores of UF membranes (FIG. 7) than linear polymers of similar chemistry and molar mass (2, 4) because of their much smaller polydispersity and globular shape (Newkome, G. R. et al., (1996) *Dendritic Molecules. Concepts-Syntheses-Perspectives*; VCH: New York.; Fréchet, J. M. J. et al., (2001) *Dendrimers and other Dendritic Polymers*; Wiley and Sons: New York.; and Bosman, A. W. et al., (1999) *Chem. Rev.* 99:1665-1668.). They have also a very low tendency to foul the commercially available regenerated cellulose (RC) membranes evaluated in this study (FIGS. 9, 10, and 11). Whereas the intrinsic viscosity of a linear polymer increases with its molar mass, that of a dendrimer decreases as it adopts a molar globular shape at higher generations (Fréchet, J. M. J. et al., (2001) *Dendrimers and other Dendritic Polymers*; Wiley and Sons: New York. and Bosman, A. W. et al., (1999) *Chem. Rev.* 99:1665-1668.). Because of this, dendrimers have a much smaller intrinsic viscosity than linear polymers with similar molar mass (Fréchet, J. M. J. et al., (2001) *Dendrimers and other Dendritic Polymers*; Wiley and Sons: New York. and Bosman, A. W. et al., (1999) *Chem. Rev.* 99:1665-1668.). Thus, comparatively smaller operating pressure, energy consumption and loss of ligands by shear-induced mechanical breakdown could be achieved with dendrimers in tangential/cross-flow UF systems typically used to recover metal ions from contaminated water (Geckeler, (1996) *Envir. Sci. Technol* 30, 725-734.). These unique properties of the Gx-NH$_2$ EDA core PAMAM dendrimers along with their low toxicity (Nanoscope Command Reference Manual; Software version 5.12, Revision B: Digital Intruments/Veeco Metrology, 2001.) make dendrimer-enhanced filtration (FIG. 1) a particularly attractive process for recovering metal ions such as Cu(II) from contaminated water.

Example 2

Use of PAMAM Dendrimers for Binding to Additional Metals

Figure 14:
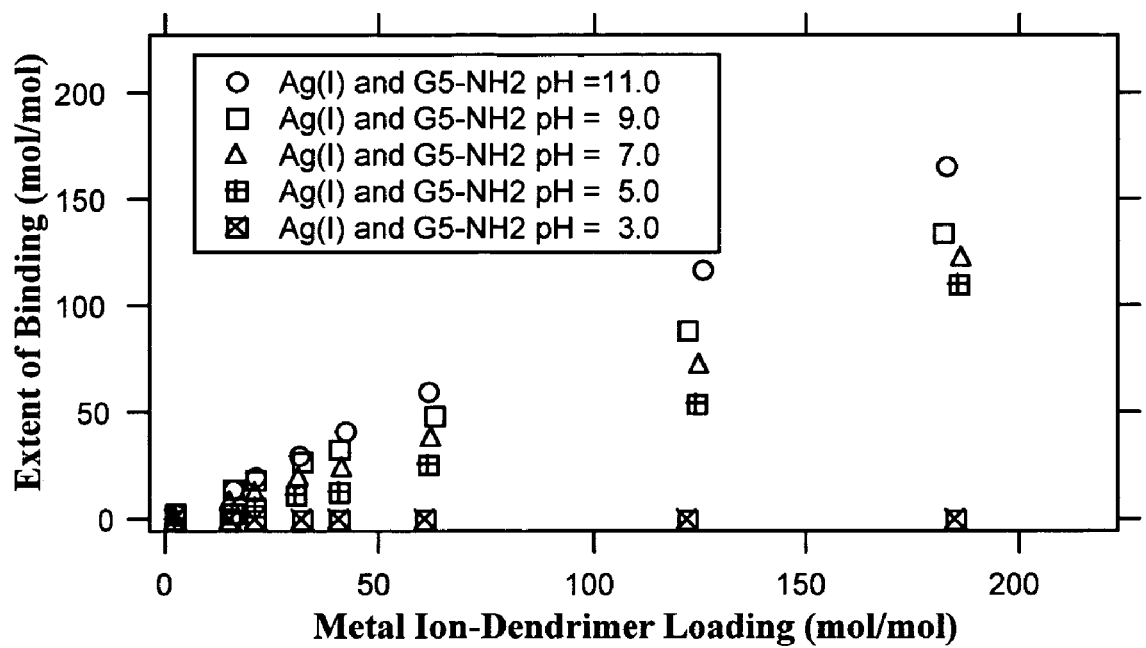
FIG. 14 shows the extent of binding of Ag(I) in aqueous solutions of EDA core G4-$NH_2$ PAMAM dendrimer at room temperature as function of solution pH and metal ion dendrimer loading in accordance with an embodiment of the present invention.
Figure 15:
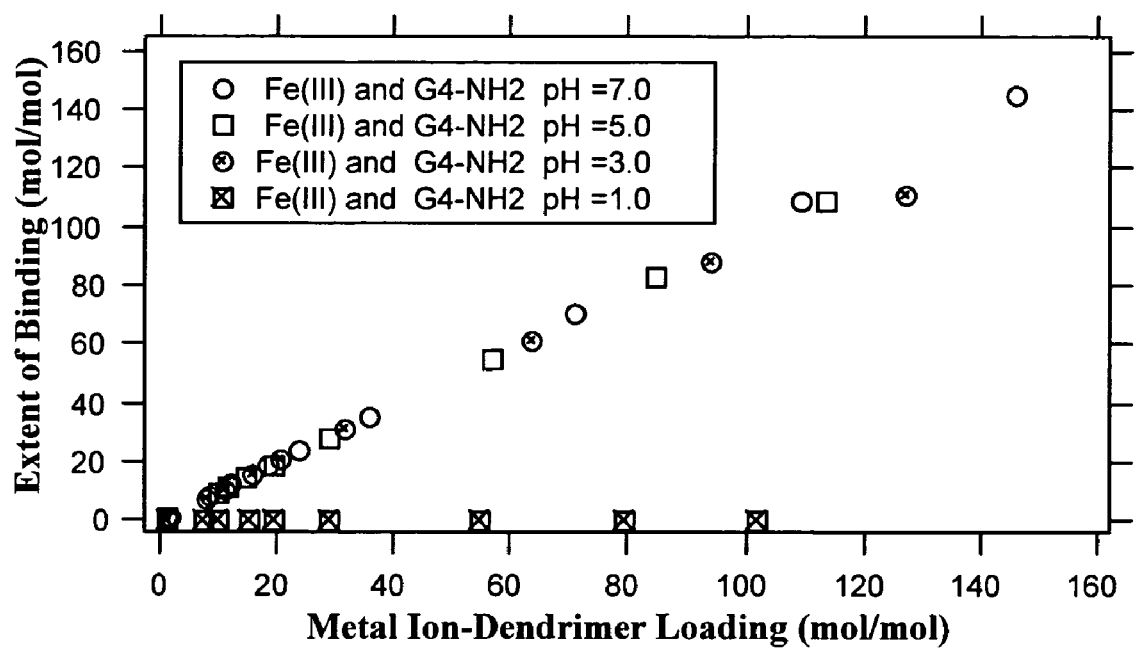
FIG. 15 shows the extent of binding of Fe(III) in aqueous solutions of EDA core G4-$NH_2$ PAMAM dendrimer at room temperature as function of solution pH and metal ion dendrimer loading in accordance with an embodiment of the present invention.
Figure 16:
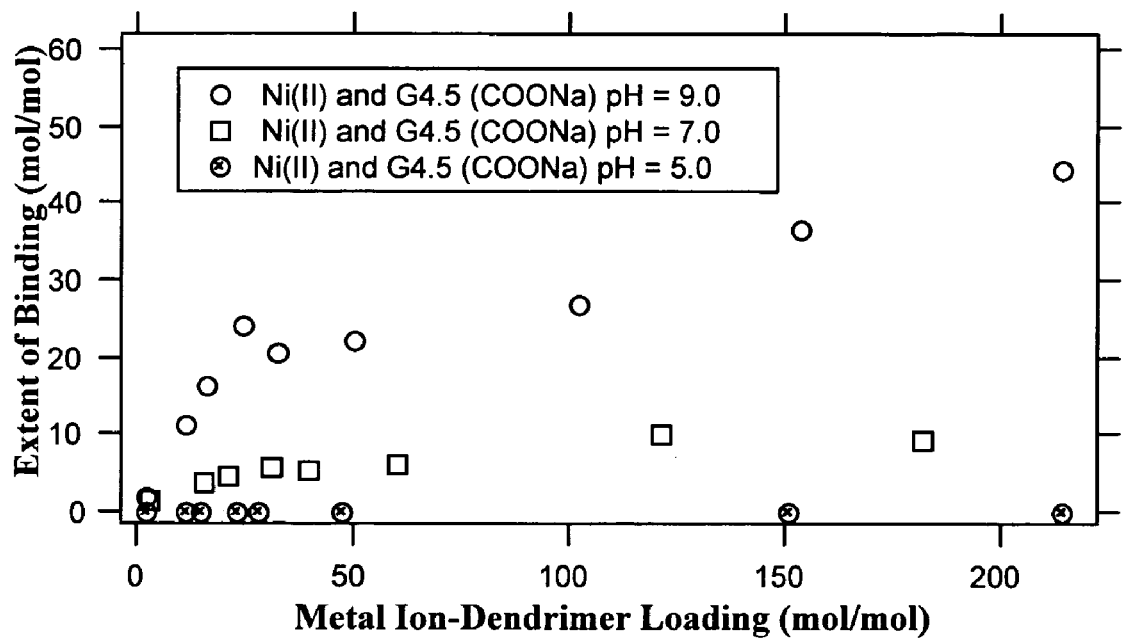
FIG. 16 shows the extent of binding of Ni(II) in aqueous solutions of EDA core G4-$NH_2$ PAMAM dendrimer at room temperature as function of solution pH and metal ion dendrimer loading in accordance with an embodiment of the present invention.

Binding of Co(II), Ag(I), Fe(III), and Ni(II) to PAMAM dendrimers were tested at room temperature as a function of pH and metal ion dendrimer loading. The extent of binding for Co(II) is shown in FIG. 13. The extent of binding for Ag(I) is shown in FIG. 14. The extent of binding of Fe(III) is shown in FIG. 15. The extent of binding of Ni(II) is shown in FIG. 16.

Example 3

This example illustrates the use of dendrimer enhanced filtration (DEF) to recover anions from aqueous solutions, and focuses on the use of dendritic ligands to bind perchlorate (ClO$_4$$^-$). The dendrimers used were fifth generation (G5-NH$_2$) poly(propylene) (PPI) dendrimer with a diaminobutane (DAB) core and terminal NH$_2$ groups. This is a water-soluble dendrimer with 64 terminal NH$_2$ groups (pK$_a$=9.8) and 62 internal tertiary amine groups (pK$_a$=6.0) with a theoretical molar mass of mass 7168 Dalton (10). The extent of binding (EOB) of perchlorate to the DAB G5-NH$_2$ core PPI dendrimer were measured.

Figure 17:
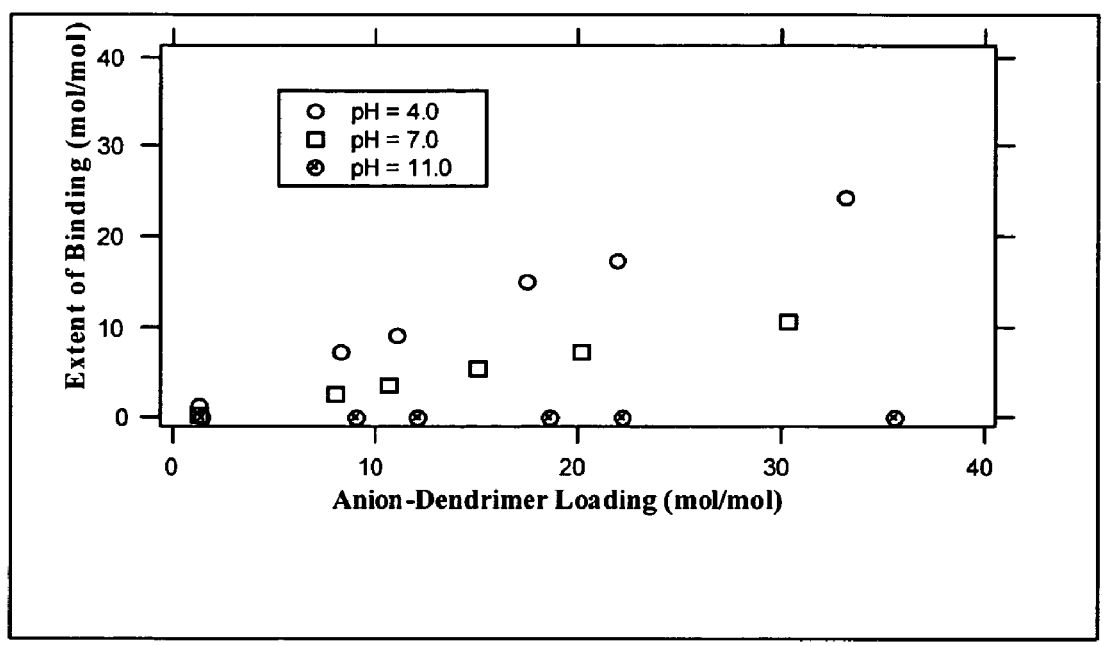
FIG. 17 shows the extent of binding of perchlorate in aqueous solutions of G5-$NH_2$ DAB core PPI dendrimer in accordance with an embodiment of the present invention.

The binding assay procedure consisted of (i) mixing and equilibrating aqueous solutions of perchlorate and dendrimer at room temperature, (ii) separating the perchlorate-dendrimer complexes from the aqueous solutions by ultrafiltration and (iii) measuring the concentration of perchlorate in the equilibrated solutions and filtrates using a Dionex DX-120 ion chromatograph with an IonPac AS16 analytical column and a IonPac AG16 guard column. FIG. 17 shows the EOB of perchlorate in aqueous solutions of the G5-NH$_2$ PPI dendrimer as a function of anion-dendrimer loading and solution pH. In these experiments, we varied the molar ratio of anion-dendrimer NH$_2$ group to prepare solutions with a given perchlorate dendrimer loading. At pH 4.0, the terminal NH$_2$ groups and tertiary amine groups of the PPI dendrimer are protonated. In this case, we observe significant binding of perchlorate up to 48 ClO$_4$$^-$ anions per mole of dendrimer. On a mass basis, this corresponds to an EOB of 923 mg of perchlorate per g of dendrimer. This is approximately 9 times larger than the amount of ClO$_4$$^-$ adsorbed (~100 mg/g) after 24 hours onto the bifunctional ion exchange resins that are currently being used to treat water contaminated by perchlorate (Moore, et al. (2003). *Environ. Sci. Technol.*, 37:3189, Brown, et al. (2000) *Perchlorate in the Environment*. Edited by Urbansky, T. E. Kluver Academic, New York, pp 155-176). Note the EOB of perchlorate in aqueous solution of the G5-NH$_2$ PPI dendrimer was measured after an equilibration time of 30 minutes compared to 24 hours for the ion exchange resin. While not wishing to be bound by any particular theory, the inventor believes that this fast binding kinetics will also be a key advantage of a homogenous liquid phase process such as DEF. FIG. 17 shows significant binding of perchlorate to the G5-NH$_2$ PPI dendrimer at pH 7.0 even though a significant fraction (>50%) of its tertiary amine groups (pK$_a$=6.0) are neutral (i.e., unprotonated). This suggests that the protonated terminal $NH_2$ ($pK_a$=9.8) groups provide a significant fraction of the electrostatic free energy of perchlorate binding to the G5-$NH_2$ PPI dendrimer. Conversely, no binding of perchlorate occurs at pH 11.0. In this case, all the tertiary and primary tertiary are neutral. The overall results of these experiments are consistent with the hypothesis that the (i) protonation of the tertiary and primary amine groups of the G5-$NH_2$ PPI dendrimer along with (ii) the hydrophobicity of its internal cavities will provide the driving force for perchlorate binding and/or encapsulation in aqueous solutions.

The results of these preliminary studies (FIG. 17) suggest that PPI and poly(amidoamine) (PAMAM) dendrimers provide ideal building blocks for the development of selective ligands for anions such as $ClO_4^-$, $CrO_4^{2-}$ and $HPO_4^{2-}$. Thus, it is expected that the replacement of the terminal and internal N groups of PPI and PAMAM dendrimers with alkyl amines, trialkyl amines and amide/pyrrole NH groups (Gale, P. A. (1999). Coord. Chem. Rev. 213:79-128) will provide a versatile synthetic route for developing anion-selective dendritic ligands for water purification. These new ligands could be tuned to bind anions at low pH (~3-5) when their N become protonated. Conversely, the bound anions could be released at higher pH (~8-9) when the N groups of these dendrimers become neutralized. In fact this is a general ligand design strategy that could be applied to most dendritic macromolecules with ionizable N groups.

Example 4

Extent of Binding of Fe(III) in Aqueous Solution

Figure 18:
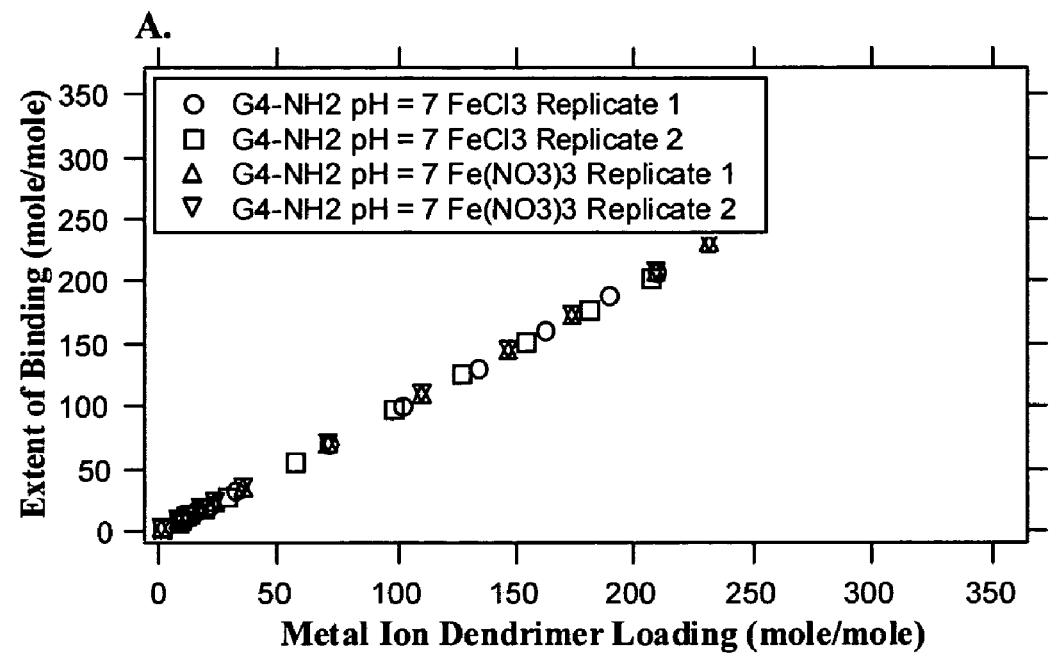
FIG. 18A shows the extent of binding of Fe(III) in aqueous solutions of EDA core G4-$NH_2$ PAMAM dendrimer at room temperature and pH=7.0 in accordance with an embodiment of the present invention.
FIG. 18B shows the fractional binding of Fe(III) in aqueous solutions of EDA core G4-$NH_2$ PAMAM dendrimer at room temperature and pH=7.0 in accordance with an embodiment of the present invention.
Figure 18:
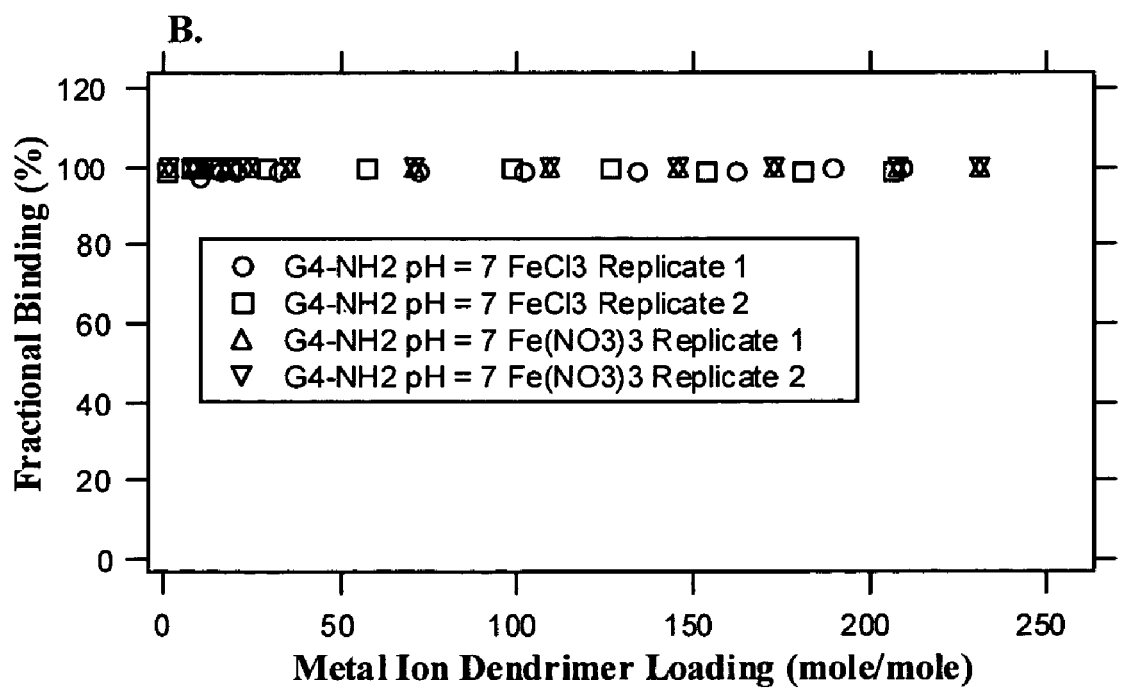

Fe(0) (zero valent iron) nanocomposites were prepared by reduction of aqueous complexes of Fe(III) with a generation 4 (G4-$NH_2$) polyamido(amine) (PAMAM) dendrimer with ethylene diamine (EDA) core and terminal $NH_2$ groups at pH 7.0. FIG. 18 shows the extent of binding and fractional binding of Fe(III) in aqueous solutions of G4-$NH_2$ EDA core PAMAM dendrimer at pH 7.0. Data were obtained using procedures shown by Diallo et al. (2004) Langmuir. 20:2640. These data indicate that most or all of the Fe is bound to the dendrimers.

Example 5

Synthesis of Zero Valent Iron PAMAM Dendrimer Nanocomposites

Redox-active Fe(0) PAMAM dendrimer nanocomposites were synthesized. The overall process involves adding Fe(III) to the interior of dendrimers and reducing the Fe(III) to Fe(0) with a reductant such as sodium borohydrate, producing dendrimers having Fe(0) deposited inside. The process leaves the surface groups of the dendrimers unmodified so that they can be used for other reactions, such as attachment to a solid surface. In this case, the Fe(0) is used in a reductive dehalogenation reaction of polychloroethylene (PCE).

The synthesis of Fe(0) PAMAM dendrimer nanocomposites was carried in 8 mL borosilicate glass vials at pH 7.0 by reacting 4 mL of aqueous solutions Fe(III)-dendrimer complexes with excess sodium borohydrate (2000 ppm). The ability of the Fe(0) dendrimer nanocomposites (94 ppm of Fe(III) and molar ratio Fe(III)-$NH_2$ 0.125) to reduce the amounts PCE (10 ppm) in aqueous solutions was evaluated using gas chromatography (GC) with electron capture detector (ECD) and flame ionization detector (FID).

Figure 19:
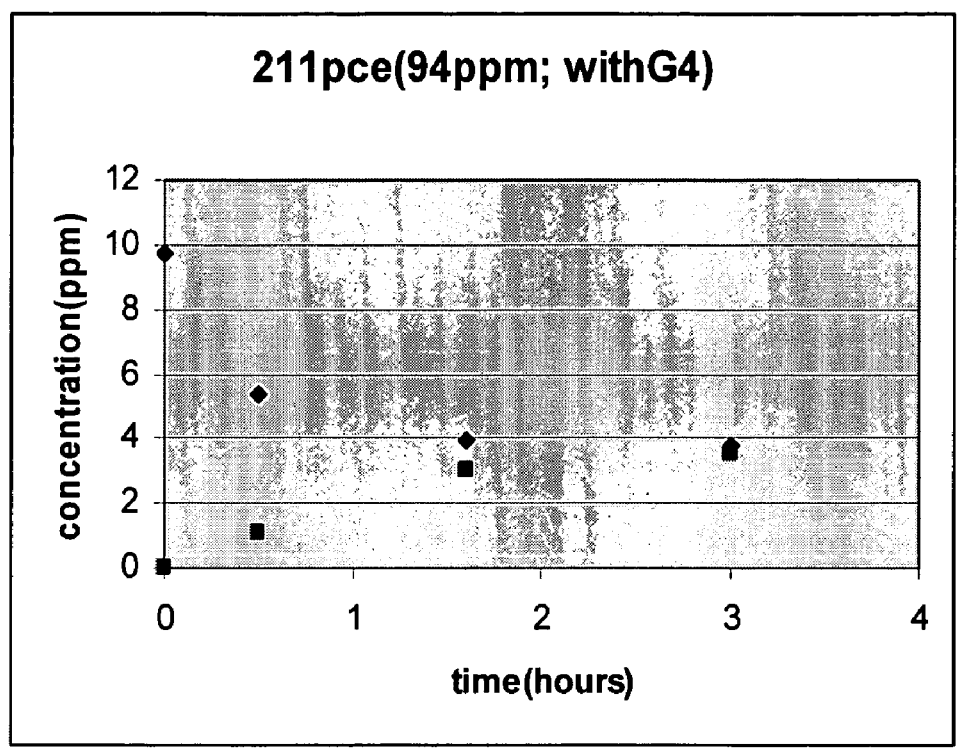
FIG. 19A shows the reductive dehalogenation of polychloroethylene in aqueous solutions of Fe(0) EDA core G4-$NH_2$ PAMAM dendrimer nanocomposites in accordance with an embodiment of the present invention. The diamonds represent the amounts of polychloroethylene, and the squares represent the amounts of tetrachloroethylene.
FIG. 19B shows the reductive dehalogenation of polychloroethylene in aqueous solutions with Fe(0) in the absence of EDA core G4-$NH_2$ PAMAM dendrimers, in accordance with an embodiment of the present invention. The diamonds represent the amounts of polychloroethylene, and the squares represent the amounts of tetrachloroethylene.
Figure 19:
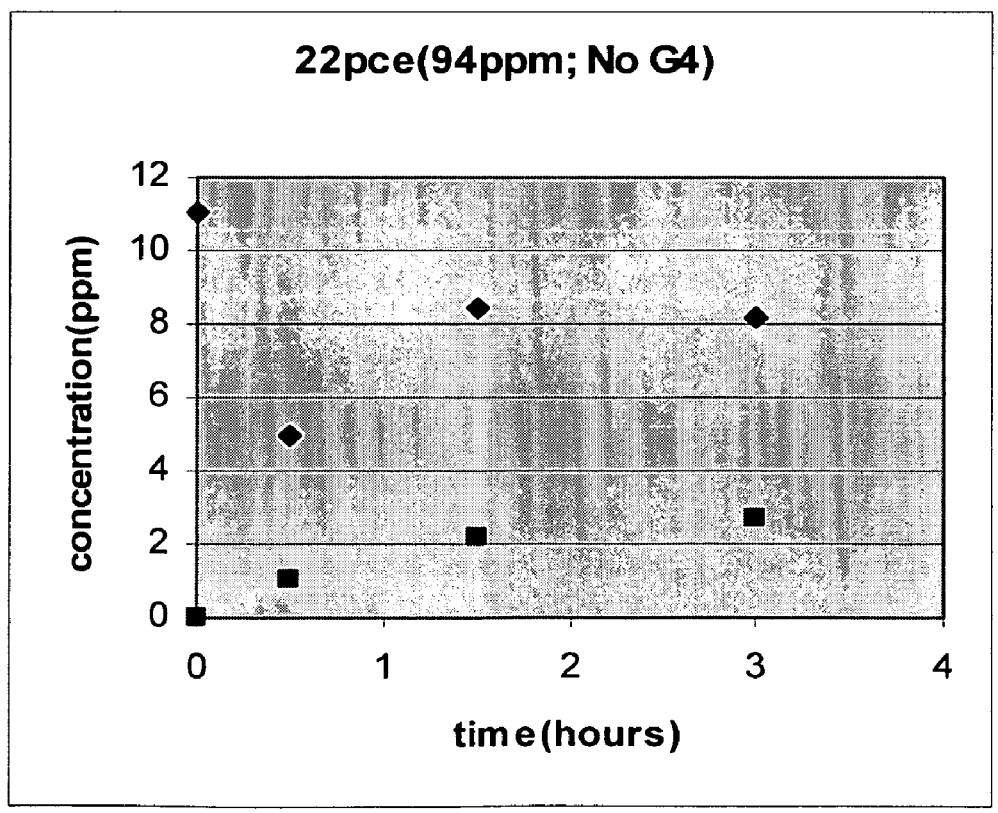

The Fe(0)-containing nanocomposites are used to convert PCE to tetrachloroethylene (TCE) (FIG. 19A). The control reaction (FIG. 19B) contains Fe(0) but no dendrimers. Preliminary investigations showed significant reduction of PCE (40-60% after 3 hours) by the Fe(0)-PAMAM dendrimer nanocomposites Conversely, only 20% of the 10 ppm of PCE was reduced in aqueous solutions in the control Fe(0) particles synthesized by reduction of 94 ppm Fe(III) with 2000 ppm of sodium borohydrate.

The results of these preliminary studies suggest that dendritic macromolecules provide ideal building blocks for developing a new generation of generation of water soluble and solid-supported redox active nanoparticles and catalysts for water purification.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of filtering contaminated water, comprising:
   providing a quantity of water containing a quantity of a contaminant;
   contacting the quantity of water with an amount of a water soluble dendritic macromolecules sufficient to bind at least a portion of the contaminant to produce a quantity of contaminant-bound dendritic macromolecules;
   filtering the quantity of contaminant-bound dendritic macromolecules from the quantity of water, comprising the step of passing the water through a first filtration membrane having pores or channels smaller than the contaminant-bound dendritic macromolecules but larger than the contaminant and larger than a water molecule, wherein the contaminant-bound dendritic macromolecules are retained on the up-stream side of the first filtration membrane, whereby a quantity of filtered water is produced;
   subjecting the contaminant-bound dendritic macromolecules to a recycling reaction to separate at least a portion of the contaminants from at least a portion of the contaminant-bound dendritic macromolecules to produce a quantity of contaminants and a quantity of unbound dendritic macromolecules, wherein the recycling reaction comprises placing the contaminant-bound dendritic macromolecule in an environment in which the dendritic macromolecule chemically or physically releases the bound contaminant, to produce a mixture of dissociated dendritic macromolecules and dissociated contaminant; and
   filtering the quantity of dendritic macromolecules from the quantity of dissociated contaminant, comprising the step of passing the mixture of dissociated dendritic macromolecules and dissociated contaminant through a second filtration membrane having pores or channels smaller than the dissociated dendritic macromolecules but larger than the dissociated contaminant, wherein the dissociated dendritic macromolecules are retained on the up-stream side of the second filtration membrane;
   wherein the contaminant is selected from the group consisting of Co(II), Ag(I), Fe(III), Ni(II), $ClO_4^-$, $TcO_4^-$, and $NO_3^-$; and wherein the dendritic macromolecule comprises:
a core;
a plurality of arms extending from the core, the arms having a branched structure including a plurality of interior secondary branches;
within the interior secondary branches, a plurality of interior branch points, each interior branch point comprising an interior functional group including a nitrogen or oxygen atom with a free electron pair capable of binding with a proton when the dendritic macromolecule is in an acidic aqueous environment; and
a plurality of terminal ends, each linked to an interior secondary branch;
wherein, when the dendritic macromolecule is placed within a first aqueous solution with a first pH between 1 and 11, and the first aqueous solution is loaded with a mass of the contaminant of about one gram of contaminant per gram of dendritic macromolecule, the extent of binding is at least twice as great as when the dendritic macromolecule is placed within a second aqueous solution with a second pH between 1 and 11, and the second aqueous solution is loaded with the mass of the contaminant.

2. The method of claim 1, wherein at least a portion of dendritic macromolecule in the dendritic macromolecule agent remain unbound by contaminants, the method further comprising filtering the unbound dendritic macromolecules from the quantity of contaminated water.

3. The method of claim 1, wherein filtering the quantity of contaminant-bound dendritic macromolecules further comprises using a process selected from the group consisting of pressure, vacuum, gravity, and combinations thereof.

4. The method of claim 1, wherein the filtration membrane is selected from the group consisting of ultrafilters, microfilters, and combinations thereof.

5. The method of claim 1, wherein the dendritic macromolecules comprise a quantity of a tecto-dendrimer.

6. The method of claim 1, wherein the dendritic macromolecules comprise a quantity of a molecule selected from the group consisting of spherical dendritic macromolecules and cylindrical dendritic macromolecules.

7. The method of claim 1, wherein the dendritic macromolecule is selected from the group consisting of cation-binding dendritic macromolecules, anion-binding dendritic macromolecules, organic compound-binding dendritic macromolecules, redox-active dendritic macromolecules, biological compound-binding dendritic macromolecules, biocidal dendritic macromolecules, viral-binding dendritic macromolecules, multi-functional dendritic macromolecules, and combinations thereof.

8. The method of claim 7, wherein the dendritic macromolecule is an organic compound-binding dendritic macromolecule and the catalyst or redox-active agent is reduced iron.

9. The method of claim 8, wherein the catalyst or redox-active agent in the dendritic macromolecule is selected from the group consisting of copper, cobalt, nickel, lead, cadmium, zinc, mercury, iron, chromium, silver, gold, cadmium, iron, palladium, platinum, gadolinium, uranium, arsenic, and combinations thereof.

10. The method of claim 1, further comprising filtering the mixture of dissociated dendritic macromolecules and dissociated contaminant by passing the mixture through a second filtration membrane having pores or channels smaller than the dissociated dendritic macromolecules but larger than the dissociated contaminant, wherein the dissociated dendritic macromolecules are retained on the up-stream side of the second filtration membrane.

11. The method of claim 1, wherein the physical or chemical bond between the contaminant and the dendritic macromolecule is sensitive to pH, and the recycling reaction comprises altering the pH of the system followed by ultrafiltration or microfiltration.

12. The method of claim 1, further comprising extracting the dissociated contaminant with a solvent in which the contaminant is soluble.

13. The method of claim 1,
wherein the contaminant is selected from the group consisting of Co(II), Ag(I), Fe(III), and Ni(II);
wherein the first pH is about 11; and
wherein the second pH is about 1.

14. The method of claim 1,
wherein the contaminant is selected from the group consisting of $ClO_4^-$, $TcO_4^-$, and $NO_3^-$;
wherein the first pH is about 4; and
wherein the second pH is about 11.

15. The method of claim 10, further comprising recycling the quantity of unbound dendritic macromolecule.

16. A water filtration system, comprising:
a reaction unit suitable for combining dendritic macromolecules with a quantity of contaminated water containing a contaminant, and for producing a quantity of water soluble contaminant-bound dendritic macromolecules and a quantity of purified water, wherein the purified water contains a lower molar concentration of contaminant than the contaminated water; and
a filtration unit in fluid communication with the reaction unit for separating at least a portion of the water soluble contaminant-bound dendritic macromolecules from the purified water, the filtration unit comprising a first filtration membrane having pores or channels smaller than the contaminant-bound dendritic macromolecules but larger than the contaminant and larger than a water molecule, wherein filtration unit is configured to retain the contaminant-bound dendritic macromolecules on the up-stream side of the first filtration membrane, such that the contaminant-bound dendritic macromolecules remain in solution; and
a dendritic macromolecule recovery unit in fluid communication with the filtration unit and configured to implement a recycling reaction to recycle a quantity of dendritic macromolecule, the recovery unit comprising:
an environment in which the dendritic macromolecule is capable of chemically or physically releasing the contaminant, to produce a mixture of dissociated dendritic macromolecules and dissociated contaminant, and
a second filtration membrane having pores or channels smaller than the dissociated dendritic macromolecules but larger than the dissociated contaminant, wherein the recovery unit is configured to retain the dissociated dendritic macromolecules on the up-stream side of the second filtration membrane;
wherein the contaminant is selected from the group consisting of Co(II), Ag(I), Fe(III), Ni(II), $ClO_4^-$, $TcO_4^-$, and $NO_3^-$; and
wherein the dendritic macromolecule comprises:
a core;
a plurality of arms extending from the core, the arms having a branched structure including a plurality of interior secondary branches;

within the interior secondary branches, a plurality of interior branch points, each interior branch point comprising an interior functional group including a nitrogen or oxygen atom with a free electron pair capable of binding with a proton when the dendritic macromolecule is in an acidic aqueous environment; and a plurality of terminal ends, each linked to an interior secondary branch;

wherein, when the dendritic macromolecule is placed within a first aqueous solution with a first pH between 1 and 11, and the first aqueous solution is loaded with a mass of the contaminant of about one gram of contaminant per gram of dendritic macromolecule, the extent of binding is at least twice as great as when the dendritic macromolecule is placed within a second aqueous solution with a second pH between 1 and 11, and the second aqueous solution is loaded with the mass of the contaminant.

17. The water filtration system of claim 16, wherein the first filtration membrane is selected from the group consisting of ultrafilters, microfilters, and combinations thereof.

18. The water filtration system of claim 16, wherein the reaction unit and the filtration unit are integrated.

19. The water filtration system of claim 16, wherein the dendritic macromolecules comprise a quantity of a tecto-dendrimer.

20. The water filtration system of claim 16, wherein the dendritic macromolecules comprise a quantity of a molecule selected from the group consisting of spherical dendritic macromolecules and cylindrical dendritic macromolecules.

21. The water filtration system of claim 16, wherein the filtration unit and the recovery unit are integrated.

22. The water filtration system of claim 16,
wherein the contaminant is selected from the group consisting of Co(II), Ag(I), Fe(III), and Ni(II);
wherein the first pH is about 11; and wherein the second pH is about 1.

23. The water filtration system of claim 16,
wherein the contaminant is selected from the group consisting of $ClO_4^-$, $TcO_4^-$, and $NO_3^-$;
wherein the first pH is about 4; and
wherein the second pH is about 11.

* * * * *